United States Patent
He et al.

(10) Patent No.: US 12,507,100 B2
(45) Date of Patent: Dec. 23, 2025

(54) METHOD AND APPARATUS FOR RANDOM ACCESS

(71) Applicant: Telefonaktiebolaget LM Ericsson (publ), Stockholm (SE)

(72) Inventors: Anqi He, Beijing (CN); Zhipeng Lin, Nanjing (CN); Ling Su, Beijing (CN); Ritesh Shreevastav, Upplands Väsby (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 17/763,727

(22) PCT Filed: Sep. 25, 2020

(86) PCT No.: PCT/CN2020/117908
§ 371 (c)(1),
(2) Date: Mar. 25, 2022

(87) PCT Pub. No.: WO2021/057928
PCT Pub. Date: Apr. 1, 2021

(65) Prior Publication Data
US 2022/0408292 A1  Dec. 22, 2022

Related U.S. Application Data

(60) Provisional application No. 62/907,176, filed on Sep. 27, 2019.

(30) Foreign Application Priority Data

Sep. 27, 2019 (WO) ................ PCT/CN2019/108566
May 14, 2020 (WO) ................ PCT/CN2020/090342

(51) Int. Cl.
*H04L 1/20* (2006.01)
*H04L 5/00* (2006.01)
(Continued)

(52) U.S. Cl.
CPC ............. *H04W 24/10* (2013.01); *H04W 8/24* (2013.01); *H04W 74/0833* (2013.01); *H04W 74/0836* (2024.01); *H04W 74/0838* (2024.01)

(58) Field of Classification Search
None
See application file for complete search history.

(56) References Cited

U.S. PATENT DOCUMENTS 11,057,938 B2 *  7/2021  Islam ................... H04L 5/0035
11,259,331 B2 *  2/2022  Jeon .................. H04W 74/0833
(Continued)

FOREIGN PATENT DOCUMENTS

CN   102065530 A   5/2011
CN   102812658 A   12/2012
(Continued)

OTHER PUBLICATIONS

Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.
(Continued)

*Primary Examiner* — Sithu Ko
(74) *Attorney, Agent, or Firm* — Withrow & Terranova, PLLC

(57) ABSTRACT

Various embodiments of the present disclosure provide a method for random access. The method which may be performed by a terminal device comprises determining whether the terminal device is capable of reporting channel state information to a network node in a random access
(Continued)

procedure. In accordance with an exemplary embodiment, the method further comprises transmitting an uplink message to the network node in the random access procedure to indicate a result of the determination.

17 Claims, 19 Drawing Sheets

(51) Int. Cl.
*H04W 8/24* (2009.01)
*H04W 24/10* (2009.01)
*H04W 74/0833* (2024.01)
*H04W 74/0836* (2024.01)
*H04W 74/0838* (2024.01)

(56) References Cited

U.S. PATENT DOCUMENTS

| | | | | |
|---|---|---|---|---|
| 11,606,819 | B2* | 3/2023 | Islam | H04W 74/0833 |
| 11,743,885 | B2* | 8/2023 | Wong | H04W 72/0453 370/329 |
| 12,231,935 | B2* | 2/2025 | Morozov | H04W 8/24 |
| 2017/0353976 | A1* | 12/2017 | Yerramalli | H04W 72/0446 |
| 2018/0110074 | A1 | 4/2018 | Akkarakaran et al. | |
| 2018/0324854 | A1* | 11/2018 | Phuyal | H04W 74/0833 |
| 2020/0383119 | A1* | 12/2020 | Sun | G16Y 10/75 |
| 2020/0396633 | A1* | 12/2020 | Tseng | H04L 5/001 |
| 2021/0195458 | A1* | 6/2021 | Priyanto | H04W 24/10 |

FOREIGN PATENT DOCUMENTS

| | | |
|---|---|---|
| CN | 106131946 A | 11/2016 |
| CN | 107182115 A | 9/2017 |
| CN | 110089153 A | 8/2019 |
| CN | 110113818 A | 8/2019 |
| EP | 2869478 A1 | 5/2015 |
| EP | 2919506 A1 | 9/2015 |
| WO | 2019158248 A1 | 8/2019 |
| WO | 2021057418 A1 | 4/2021 |
| WO | 2021059239 A1 | 4/2021 |

OTHER PUBLICATIONS

Author Unknown, "Technical Specification Group Radio Access Network; NR; Physical channels and modulation (Release 16)," Technical Specification 38.211, Version 16.1.0, Mar. 2020, 3GPP Organizational Partners, 130 pages.
Author Unknown, "Technical Specification Group Radio Access Network; NR; Physical layer procedures for control (Release 15)," Technical Specification 38.213, Version 15.6.0, Jun. 2019, 3GPP Organizational Partners, 107 pages.
Author Unknown, "Technical Specification Group Radio Access Network; NR; Physical layer procedures for control (Release 16)," Technical Specification 38.213, Version 16.1.0, Mar. 2020, 3GPP Organizational Partners, 156 pages.
Author Unknown, "Technical Specification Group Radio Access Network; NR; Physical layer procedures for data (Release 15)," Technical Specification 38.214, Version 15.6.0, Jun. 2019, 3GPP Organizational Partners, 105 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 519 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
International Search Report and Written Opinion for International Patent Application No. PCT/CN2020/117908, mailed Jan. 4, 2021, 11 pages.
Ericsson, "R1-1907179: Use Cases and Scenarios for 2-Step Rach," 3GPP TSG-RAN WG1 Meeting #97, May 13-17, 2019, Reno, Nevada, 4 pages.
Nokia, et al., "R2-1906588: Early measurement reporting details, " 3GPP TSG-RAN WG2 Meeting #106, May 13-17, 2019, Reno, Nevada, 3 pages.
Oppo, "R1-1906581: On Procedure for 2-step Rach," 3GPP TSG RAN WG1 #97, May 13-17, 2019, Reno, Nevada, 7 pages.
International Search Report and Written Opinion for International Patent Application No. PCT/CN2020/113069, mailed Dec. 1, 2020, 6 pages.
International Search Report and Written Opinion for International Patent Application No. PCT/IB2020/059012, mailed Dec. 18, 2020, 10 pages.
Extended European Search Report for European Patent Application No. 20870304.1, mailed Jan. 3, 2023, 7 pages.
Ericsson, "R1-1907472: Early CSI reporting in HO," 3GPP TSG-RAN WG1 Meeting #97, May 13-17, 2019, Reno, Nevada, 3 pages.
Office Action for Canadian Patent Application No. 3154747, mailed Mar. 30, 2023, 4 pages.
Office Action for Canadian Patent Application No. 3154747, mailed Jan. 3, 2024, 5 pages.
Extended European Search Report for European Patent Application No. 20867260.0, mailed Oct. 27, 2023, 9 pages.
Notice of Reasons for Refusal for Japanese Patent Application No. 2022-519422, mailed May 30, 2023, 7 pages.
Decision of Refusal for Japanese Patent Application No. 2022-519422, mailed Nov. 21, 2023, 5 pages.
Reconsideration Report for Japanese Patent Application No. 2022-519422, mailed Jul. 2, 2024, 4 pages.
Notice of Reasons for Refusal for Japanese Patent Application No. 2022-519422, mailed Nov. 5, 2024, 16 pages.
First Office Action for Chinese Patent Application No. 202080067561.7, mailed Apr. 22, 2023, 12 pages.
Second Office Action for Chinese Patent Application No. 202080067561.7, mailed Sep. 22, 2023, 10 pages.
Rejection Decision for Chinese Patent Application No. 202080067561.7, mailed Apr. 10, 2024, 13 pages.
Intention to Grant for European Patent Application No. 20870304.1, mailed Mar. 20, 2025, 8 pages.
Trial and Appeal Decision for Japanese Patent Application No. 2022-519422, mailed Apr. 22, 2024, 4 pages.

\* cited by examiner

RACH-ConfigGeneric information element

```
-- ASN1START
-- TAG-RACH-CONFIG-GENERIC-START

RACH-ConfigGeneric ::=           SEQUENCE {
    prach-ConfigurationIndex         INTEGER (0..255),
    msg1-FDM                         ENUMERATED {one, two, four, eight},
    msg1-FrequencyStart              INTEGER (0..maxNrofPhysicalResourceBlocks-1),
    zeroCorrelationZoneConfig        INTEGER(0..15),
    preambleReceivedTargetPower      INTEGER (-202..-60),
    preambleTransMax                 ENUMERATED {n3, n4, n5, n6, n7, n8, n10, n20,
n50, n100, n200},
    powerRampingStep                 ENUMERATED {dB0, dB2, dB4, dB6},
    ra-ResponseWindow                ENUMERATED {sl1, sl2, sl4, sl8, sl10, sl20, sl40,
sl80},
    ...
}

-- TAG-RACH-CONFIG-GENERIC-STOP
-- ASN1STOP
```

Fig.1E

RRCSetupAndMeasurementRequest message

```
-- ASN1START
-- TAG-RRCSETUPREQUEST-START

RRCSetupAndMeasurementRequest-r17 ::=            SEQUENCE {
    rrcSetupRequest              RRCSetupRequest-IEs
}

RRCSetupRequest-IEs ::=         SEQUENCE {
    ue-Identity                   InitialUE-Identity,
    establishmentCause            EstablishmentCause,
    measurementReport             MeasurementReport
}

InitialUE-Identity ::=          CHOICE {
    ng-5G-S-TMSI-Part1            BIT STRING (SIZE (39)),
    randomValue                   BIT STRING (SIZE (39))
}

EstablishmentCause ::=          ENUMERATED {
                                emergency, highPriorityAccess, mt-Access,
mo-Signalling,
                                mo-Data, mo-VoiceCall, mo-VideoCall, mo-SMS,
mps-PriorityAccess, mcs-PriorityAccess,
                                spare6, spare5, spare4, spare3, spare2, spare1}

MeasurementReport ::=           SEQUENCE {
    rsrp                        INTEGER(0..97)  OPTIONAL,
    rsrq                        INTEGER (0..34) OPTIONAL,
    bestBeamIndex               INTEGER (0..64) OPTIONAL,
    pmiRankIndiactor            INTEGER (0..8)  OPTIONAL,
    cqi                         INTEGER (0..15) OPTIONAL,
    ...

}

-- TAG-RRCSETUPREQUEST-STOP
-- ASN1STOP
```

Fig.2C

METHOD AND APPARATUS FOR RANDOM ACCESS

This application is a 35 U.S.C. § 371 national phase filing of International Application No. PCT/CN2020/117908, filed Sep. 25, 2020, which claims the benefit of International Application No. PCT/CN2020/090342, filed May 14, 2020, and International Application No. PCT/CN2019/108566, filed Sep. 27, 2019, and U.S. Provisional Application Ser. No. 62/907,176, filed Sep. 27, 2019, the disclosures of which are incorporated herein by reference in their entireties.

FIELD OF THE INVENTION

The present disclosure generally relates to communication networks, and more specifically, to a method and apparatus for random access.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to connect to a network node, a random access (RA) procedure may be initiated for a terminal device. In the RA procedure, system information (SI) and synchronization signals (SS) as well as the related radio resource and transmission configuration can be informed to the terminal device by signaling messages from the network node. The RA procedure can enable the terminal device to establish a session for a specific service with the network node.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as a NR/5G network may be able to support flexible network configurations. Different signaling approaches (e.g., a four-step approach, a two-step approach, etc.) may be used for a RA procedure of a terminal device such as a user equipment (UE) to set up a connection with a network node such as a base station (BS). In the RA procedure, the terminal device may perform a RA preamble transmission and a physical uplink shared channel (PUSCH) transmission to the network node in different messages (e.g., in Message 1/Msg1 and Message 3/Msg3 for four-step RA, respectively) or in the same message (e.g., in Message A/MsgA for two-step RA). The RA preamble may be transmitted in a time-frequency physical random access channel (PRACH) occasion (which is also known as a RA occasion, RACH occasion, or RO for short). The PUSCH transmission may occur in a PUSCH occasion (PO) configured with one or more demodulation reference signal (DMRS) resources. In order to implement downlink (DL) link adaptation, the BS may request a channel state information (CSI) report in Msg3 or MsgA from the UE. This CSI report may be referred to as an early CSI report, compared to a CSI report (also called a normal CSI report in this document) from the UE in radio resource control (RRC) connected state supported in the 3rd generation partnership project (3GPP) NR Release 15 and Release 16, e.g. as defined in 3GPP technical specification (TS) 38.214 V16.1.0, where the entire content of this technical specification is incorporated into the present disclosure by reference. However, the UE may not respond to the request for the early CSI report from the BS, if the UE has no capability of reporting the CSI during a RA procedure. In addition, since the BS may not be able to identify which UEs have the early CSI report capability, the BS may not treat the UEs with different capabilities appropriately. Therefore, it may be desirable to implement CSI reporting in a RA procedure more efficiently.

Various embodiments of the present disclosure propose a solution for RA, which can enable CSI to be transmitted from a terminal device to a network node in a RA procedure selectively or conditionally, for example, according to whether the terminal device is capable of reporting the CSI to the network node in the RA procedure and/or other possible requirements, so as to implement an early CSI report in a flexible and efficient way.

It can be appreciated that the terms "four-step RA procedure" and "four-step RACH procedure" mentioned herein may also be referred to as Type-1 random access procedure as defined in 3GPP TS 38.213 V16.1.0, where the entire content of this technical specification is incorporated into the present disclosure by reference. These terms may be used interchangeably in this document.

Similarly, it can be appreciated that the terms "two-step RA procedure" and "two-step RACH procedure" mentioned herein may also be referred to as Type-2 random access procedure as defined in 3GPP TS 38.213 V16.1.0, and these terms may be used interchangeably in this document.

It can be realized that the terms "PRACH occasion", "random access channel (RACH) occasion" or "RA occasion" mentioned herein may refer to a time-frequency resource usable for the preamble transmission in a RA procedure, which may also be referred to as "random access occasion (RO)". These terms may be used interchangeably in this document.

Similarly, it can be realized that the terms "PUSCH occasion", "uplink shared channel occasion" or "shared channel occasion" mentioned herein may refer to a time-frequency resource usable for PUSCH transmission in a RA procedure, which may also be referred to as "physical uplink shared channel occasion (PO)". These terms may be used interchangeably in this document.

According to a first aspect of the present disclosure, there is provided a method performed by a terminal device such as a UE. The method comprises determining whether the terminal device is capable of reporting CSI to a network node in a RA procedure. In accordance with some exemplary embodiments, the method further comprises transmitting an uplink (UL) message to the network node in the RA procedure to indicate a result of the determination.

In accordance with some exemplary embodiments, the UL message may indicate whether the terminal device is capable of reporting the CSI to the network node in the RA procedure, by using one or more of: a preamble, a RO, an identifier in a protocol header, and a RA type.

In accordance with some exemplary embodiments, the UL message may include a preamble selected from a predetermined group of preambles. The preamble may be used to indicate that the terminal device is capable of reporting the CSI to the network node in the RA procedure.

In accordance with some exemplary embodiments, the preamble may be further used to indicate at least part of the CSI to the network node.

In accordance with some exemplary embodiments, the predetermined group of preambles may be configured for terminal devices capable of reporting CSI during RA.

In accordance with some exemplary embodiments, the predetermined group of preambles may be informed to the terminal device by a first signaling from the network node. The first signaling may include the number of the predetermined group of preambles and/or one or more indicators of the predetermined group of preambles.

In accordance with some exemplary embodiments, the predetermined group of preambles may be divided into two or more subgroups of preambles. The two or more subgroups of preambles may be respectively associated to uplink shared channel (UL-SCH) transmissions with different payload sizes.

In accordance with some exemplary embodiments, the UL message may include a preamble in a RO selected from a predetermined set of ROs. The RO may be used to indicate that the terminal device is capable of reporting the CSI to the network node in the RA procedure.

In accordance with some exemplary embodiments, the RO may be further used to indicate at least part of the CSI to the network node.

In accordance with some exemplary embodiments, the predetermined set of ROs may be reserved or configured for terminal devices capable of reporting CSI during RA.

In accordance with some exemplary embodiments, the predetermined set of ROs may be informed to the terminal device by a second signaling from the network node. The second signaling may include frequency information and/or time information of the predetermined set of ROs.

In accordance with some exemplary embodiments, the UL message may include an identifier in a protocol header. The identifier may be used to indicate that the terminal device is capable of reporting the CSI to the network node in the RA procedure.

In accordance with some exemplary embodiments, the identifier may be further used to indicate at least part of the CSI to the network node.

In accordance with some exemplary embodiments, the identifier may be a logical channel identifier (LCID), and the protocol header may be a header of a medium access control (MAC) protocol data unit (PDU) included in the UL message.

In accordance with some exemplary embodiments, the UL message may be associated with a RA type. The RA type may be used to indicate that the terminal device is capable of reporting the CSI to the network node in the RA procedure.

In accordance with some exemplary embodiments, the RA type may be further used to indicate at least part of the CSI to the network node.

In accordance with some exemplary embodiments, the RA type may comprise at least one of: two-step RA, four-step RA, contention-based random access (CBRA) and contention-free random access (CFRA).

In accordance with some exemplary embodiments, the UL message may further indicate whether resources no less than a threshold are required for an UL-SCH transmission of the terminal device in the RA procedure.

In accordance with some exemplary embodiments, the terminal device may be determined to be capable of reporting the CSI in the RA procedure.

In accordance with some exemplary embodiments, the method according to the first aspect of the present disclosure may further comprise: receiving a request for the CSI from the network node in the RA procedure, and determining whether to report the CSI to the network node in the RA procedure.

In accordance with some exemplary embodiments, the determination of whether to report the CSI to the network node in the RA procedure may be performed according to one or more of:
  whether downlink signaling is received by the terminal device from the network node to activate the reporting of the CSI;
  whether a measurement on signal quality of the terminal device meets a first requirement; and
  whether resource allocation for reporting the CSI meets a second requirement.

In accordance with some exemplary embodiments, the downlink signaling may indicate one or more of:
  a predetermined group of preambles which are configured for terminal devices capable of reporting CSI during RA; and
  a predetermined set of ROs which are reserved or configured for terminal devices capable of reporting CSI during RA.

In accordance with some exemplary embodiments, the method according to the first aspect of the present disclosure may further comprise: reporting the CSI to the network node in the RA procedure, in response to determining to report the CSI to the network node.

In accordance with some exemplary embodiments, the CSI may be reported at least partly to the network node by a radio resource control (RRC) message in an UL-SCH.

In accordance with some exemplary embodiments, the CSI may be reported at least partly to the network node by a MAC PDU in an UL-SCH.

In accordance with some exemplary embodiments, the method according to the first aspect of the present disclosure may further comprise: transmitting an UL-SCH without the CSI to the network node in the RA procedure, in response to determining not to report the CSI to the network node.

According to a second aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus comprises a determining unit and a transmitting unit. In accordance with some exemplary embodiments, the determining unit is operable to carry out at least the determining step of the method according to the first aspect of the present disclosure. The transmitting unit is operable to carry out at least the transmitting step of the method according to the first aspect of the present disclosure.

According to a fifth aspect of the present disclosure, there is provided a method performed by a network node such as a base station. The method comprises receiving an UL message from a terminal device in a RA procedure. In accordance with some exemplary embodiments, the method further comprises determining whether the terminal device is capable of reporting CSI to the network node in the RA procedure, according to the UL message.

In accordance with some exemplary embodiments, the UL message according to the fifth aspect of the present disclosure may correspond to the UL message according to the first aspect of the present disclosure. Thus, the UL message according to the first and fifth aspects of the present disclosure may have the same or similar contents and/or feature elements.

In accordance with some exemplary embodiments, the method according to the fifth aspect of the present disclosure may further comprise: allocating resources to the terminal device for an UL-SCH transmission in the RA procedure, according to the UL message.

In accordance with some exemplary embodiments, the method according to the fifth aspect of the present disclosure may further comprise: transmitting a request for the CSI to the terminal device in the RA procedure, in response to determining that the terminal device is capable of reporting the CSI.

In accordance with some exemplary embodiments, the method according to the fifth aspect of the present disclosure may further comprise: detecting the CSI selectively reported by the terminal device in the RA procedure, in response to determining that the terminal device is capable of reporting the CSI.

According to a sixth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus comprises a receiving unit and a determining unit. In accordance with some exemplary embodiments, the receiving unit is operable to carry out at least the receiving step of the method according to the fifth aspect of the present disclosure. The determining unit is operable to carry out at least the determining step of the method according to the fifth aspect of the present disclosure.

According to a ninth aspect of the present disclosure, there is provided a method performed by a terminal device such as a UE. The method comprises receiving a request for CSI from a network node in a RA procedure. In accordance with some exemplary embodiments, the method further comprises determining whether to report the CSI to the network node in the RA procedure.

In accordance with some exemplary embodiments, the determination of whether to report the CSI to the network node in the RA procedure may be performed according to one or more of:
  whether downlink signaling is received by the terminal device from the network node to activate the reporting of the CSI;
  whether a measurement on signal quality of the terminal device meets a first requirement; and
  whether resource allocation for reporting the CSI meets a second requirement.

In accordance with some exemplary embodiments, the downlink signaling may indicate a predetermined group of preambles which are configured for terminal devices capable of reporting CSI during RA. Alternatively or additionally, the downlink signaling may indicate a predetermined set of ROs which are reserved or configured for terminal devices capable of reporting CSI during RA.

In accordance with some exemplary embodiments, the method according to the ninth aspect of the present disclosure may further comprise: reporting the CSI to the network node in the RA procedure, in response to determining to report the CSI to the network node.

In accordance with some exemplary embodiments, the method according to the ninth aspect of the present disclosure may further comprise: transmitting an UL-SCH without the CSI to the network node in the RA procedure, in response to determining not to report the CSI to the network node.

According to a tenth aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus which may be implemented as a terminal device. The apparatus comprises a receiving unit and a determining unit. In accordance with some exemplary embodiments, the receiving unit is operable to carry out at least the receiving step of the method according to the ninth aspect of the present disclosure. The determining unit is operable to carry out at least the determining step of the method according to the ninth aspect of the present disclosure.

According to a thirteenth aspect of the present disclosure, there is provided a method performed by a network node such as a base station. The method comprises transmitting a request for CSI to a terminal device in a RA procedure. In accordance with some exemplary embodiments, the method further comprises detecting the CSI which is selectively reported by the terminal device in the RA procedure.

In accordance with some exemplary embodiments, the CSI according to the thirteenth aspect of the present disclosure may correspond to the CSI according to the ninth aspect of the present disclosure. Thus, the CSI according to the ninth and thirteenth aspects of the present disclosure may be reported in the same or similar way. In addition, the determination of whether to report the CSI according to the ninth aspect of the present disclosure and the selective reporting of the CSI according to the thirteenth aspect of the present disclosure may be based on the same or similar parameter(s) and/or rule(s).

According to a fourteenth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon which, when executed on a computer, cause the computer to perform any step of the method according to the thirteenth aspect of the present disclosure.

According to a sixteenth aspect of the present disclosure, there is provided an apparatus which may be implemented as a network node. The apparatus comprises a transmitting unit and a detecting unit. In accordance with some exemplary embodiments, the transmitting unit is operable to carry out at least the transmitting step of the method according to the thirteenth aspect of the present disclosure. The detecting unit is operable to carry out at least the detecting step of the method according to the thirteenth aspect of the present disclosure.

According to a seventeenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth or thirteenth aspect of the present disclosure.

According to an eighteenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth or thirteenth aspect of the present disclosure.

According to a nineteenth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first or ninth aspect of the present disclosure.

According to a twentieth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first or ninth aspect of the present disclosure.

According to a twenty-first aspect of the present disclosure, there is provided a method implemented in a communication system which may include a host computer, a base station and a UE. The method may comprise, at the host computer, receiving user data transmitted to the base station from the UE which may perform any step of the method according to the first or ninth aspect of the present disclosure.

According to a twenty-second aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first or ninth aspect of the present disclosure.

According to a twenty-third aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth or thirteenth aspect of the present disclosure.

According to a twenty-fourth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth or thirteenth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 1E is a diagram illustrating an exemplary information element (IE) for RA according to an embodiment of the present disclosure;

FIG. 2C is a diagram illustrating an exemplary RRC message according to an embodiment of the present disclosure;

DETAILED DESCRIPTION

Figure 1A:
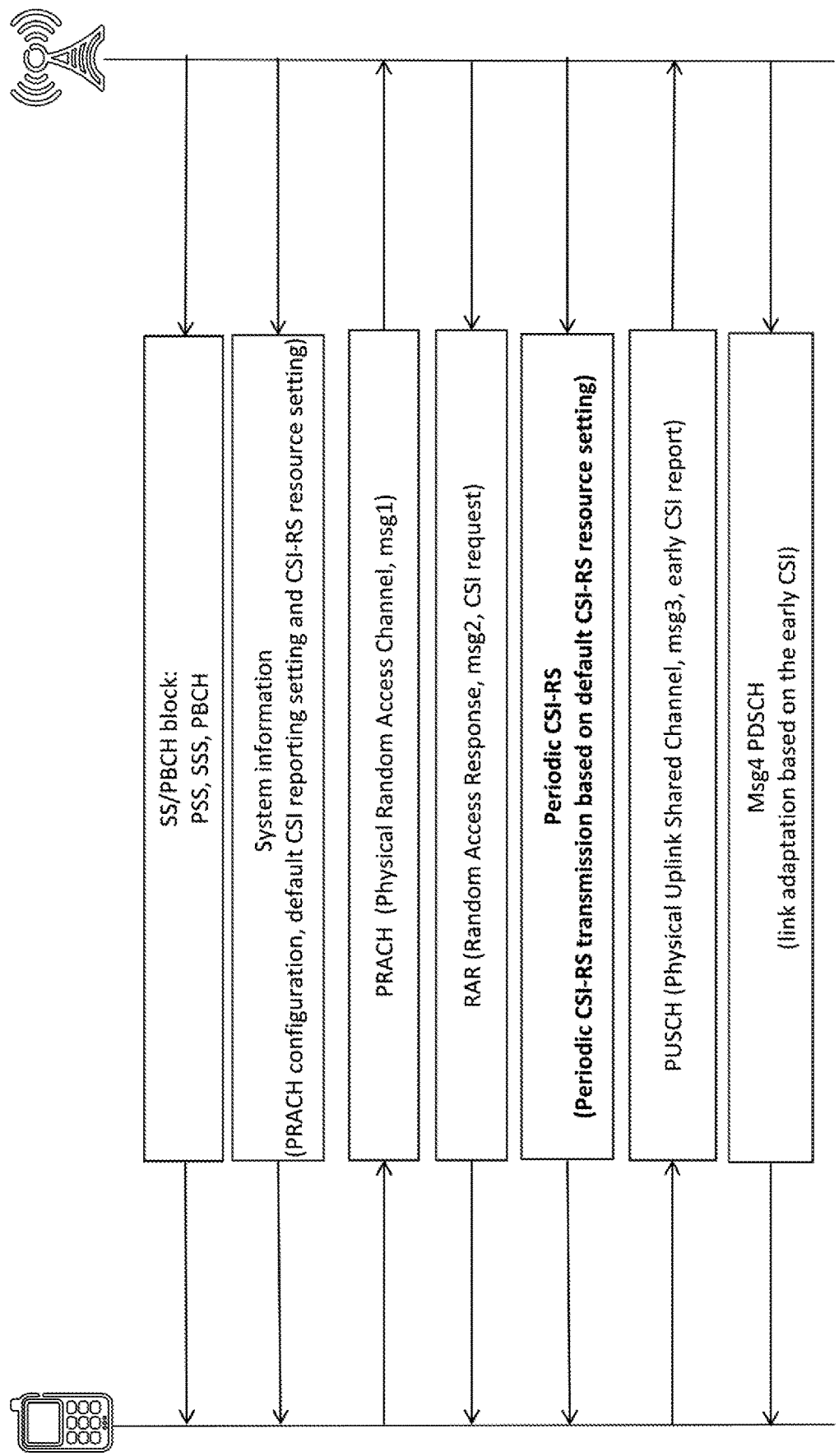
FIG. 1A is a diagram illustrating an exemplary early CSI report in four-step RA procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-tomachine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a network node such as a BS in a wireless communication network, a terminal device such as a UE may need to perform a RA procedure to exchange essential information and messages for communication link establishment with the network node. In some cases, the BS may request an early CSI report in Msg3 or MsgA from the UE. According to the reported CSI report, the DL link adaptation may be enabled in Message 4/Msg4 or Message B/MsgB and further the DL coverage can be enhanced.

FIG. 1A is a diagram illustrating an exemplary early CSI report in four-step RA procedure according to an embodiment of the present disclosure. As shown in FIG. 1A, a UE can detect a synchronization signal (SS) by receiving an SSB (e.g., a primary synchronization signal (PSS), a secondary synchronization signal (SSS), and physical broadcast channel (PBCH)) from a gNB in a NR system. The UE can decode some system information (e.g., including PRACH configuration, default CSI reporting setting, channel state information-reference signal (CSI-RS) resource setting, etc.) broadcasted in DL. In the four-step RA procedure, the UE may initiate random access by transmitting in UL a RA preamble (Msg 1) on a PRACH. After detecting Msg1, the gNB may respond by transmitting in DL a random-access response (RAR) on a physical downlink shared channel (PDSCH). According to an embodiment, the gNB may include a CSI request in the RAR (Msg2), and transmit the periodic CSI-RS to the UE, e.g. based on default CSI-RS resource setting. After successfully decoding Msg2, the UE may continue the RA procedure by transmitting in UL a PUSCH (Msg3) for terminal identification and RRC connection establishment request. An early CSI report may be carried in Msg3. Then the gNB may transmit in DL a PDSCH (Msg4) for contention resolution, where the DL link adaptation may be performed based on the early CSI.

Figure 1B:
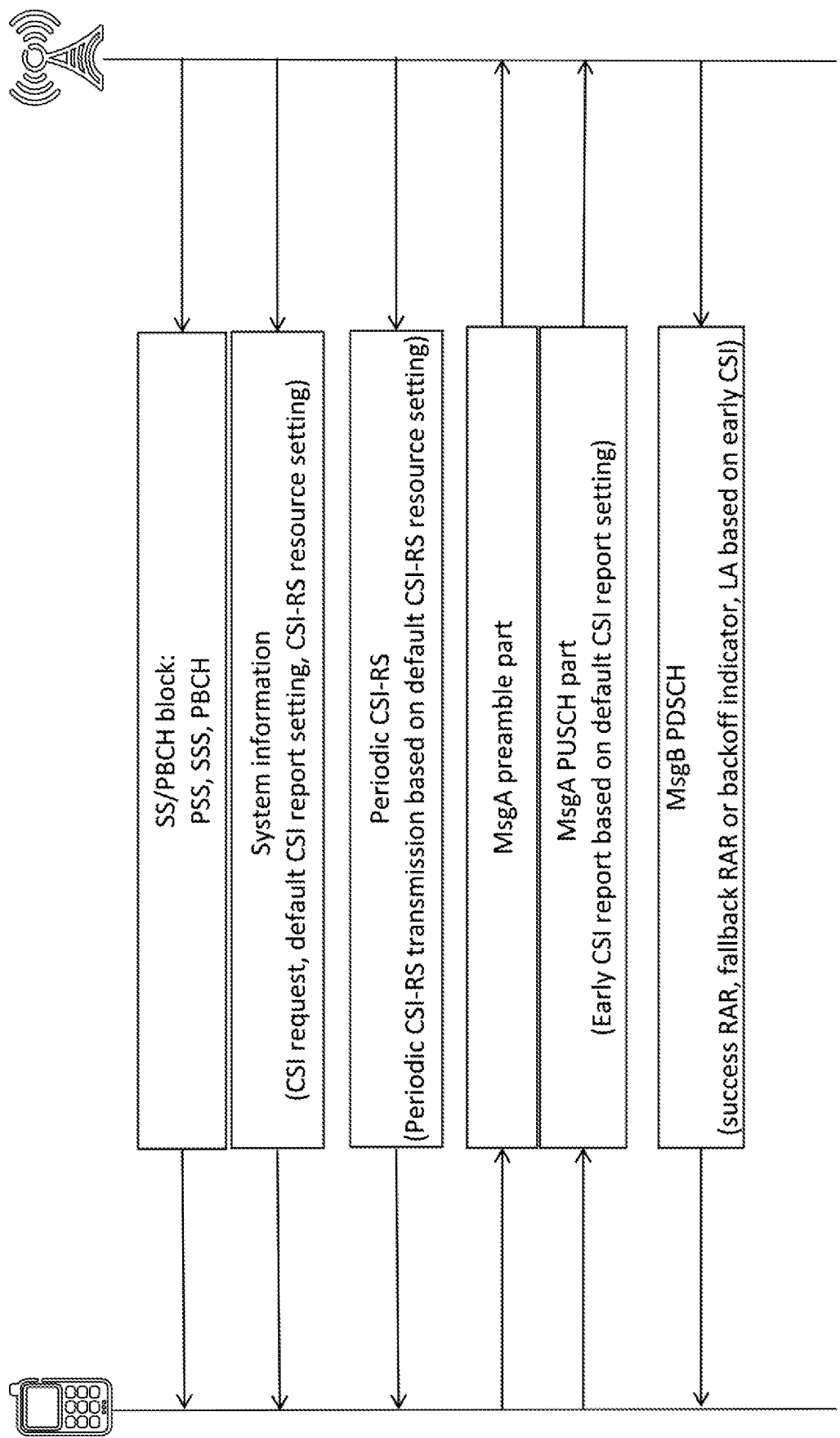
FIG. 1B is a diagram illustrating an exemplary early CSI report in two-step RA procedure according to an embodiment of the present disclosure.

FIG. 1B is a diagram illustrating an exemplary early CSI report in two-step RA procedure according to an embodiment of the present disclosure. Similar to the procedure as shown in FIG. 1A, in the procedure shown in FIG. 1B, a UE can detect a SS by receiving an SSB (e.g., comprising a PSS, a SSS and PBCH) from a gNB in a NR system, and decode system information (e.g., including a CSI request, default CSI reporting setting, CSI-RS resource setting, etc.) broadcasted in the DL. Compared to the four-step approach as shown in FIG. 1A, the UE performing the procedure in FIG. 1B can complete random access in only two steps. Firstly, the UE sends to the gNB a message A (abbreviated "MsgA" or "msgA", where these two abbreviations may be used interchangeably in this document) including RA preamble together with higher layer data such as an RRC connection request possibly with some payload on PUSCH. Secondly, after detecting the MsgA, the gNB sends to the UE a RAR (also called message B or abbreviated "MsgB" or "msgB", where these two abbreviations may be used interchangeably in this document) including UE identifier assignment, timing advance information, a contention resolution message, and etc. It can be seen that there may be no explicit grant from MsgB for PUSCH in MsgA as the MsgB is after MsgA.

In accordance with an exemplary embodiment, the normal CSI report (i.e., the CSI report sent by a UE in RRC connected state) may be configured as periodic, semi-persistent and aperiodic transmission when the UE is in RRC connected mode. While for the early CSI report (i.e., the CSI report sent by a UE in a RA procedure), the aperiodic CSI report may be triggered by higher layers. Optionally, the early CSI report may be based on measurements on periodic or aperiodic CSI-RS, or based on measurements on SSB, and reported in Msg3 PUSCH (as shown in FIG. 1A) or MsgA PUSCH (as shown in FIG. 1B).

Figure 1C:
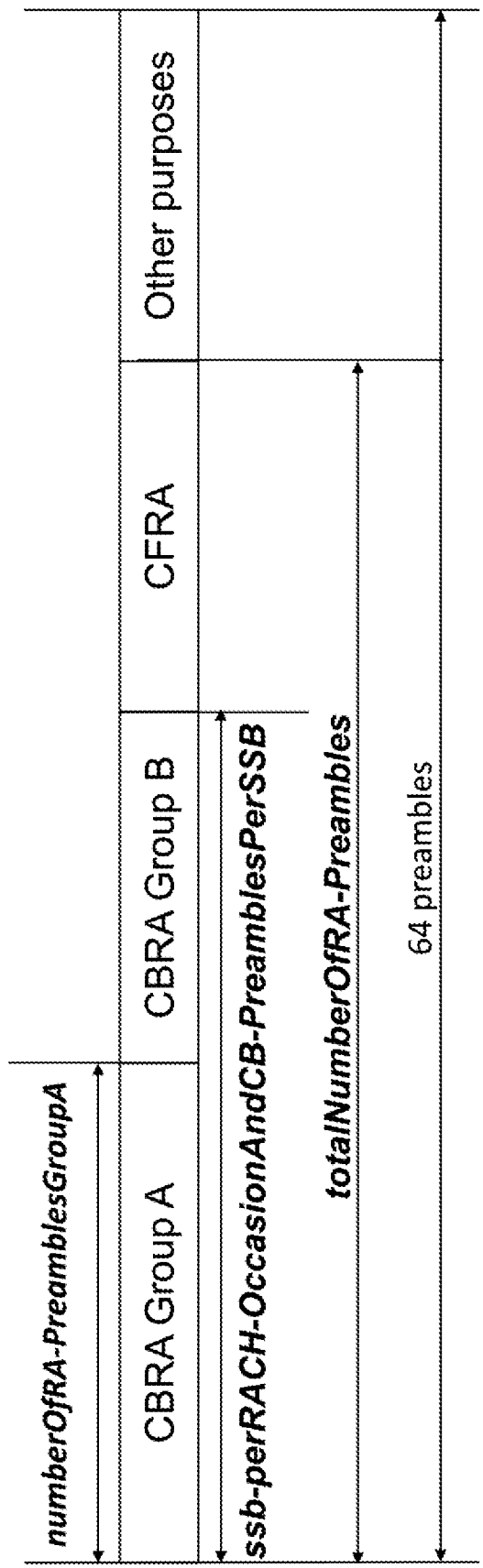
FIGS. 1C-1D are diagrams illustrating examples of preamble allocation according to some embodiments of the present disclosure.
Figure 1D:
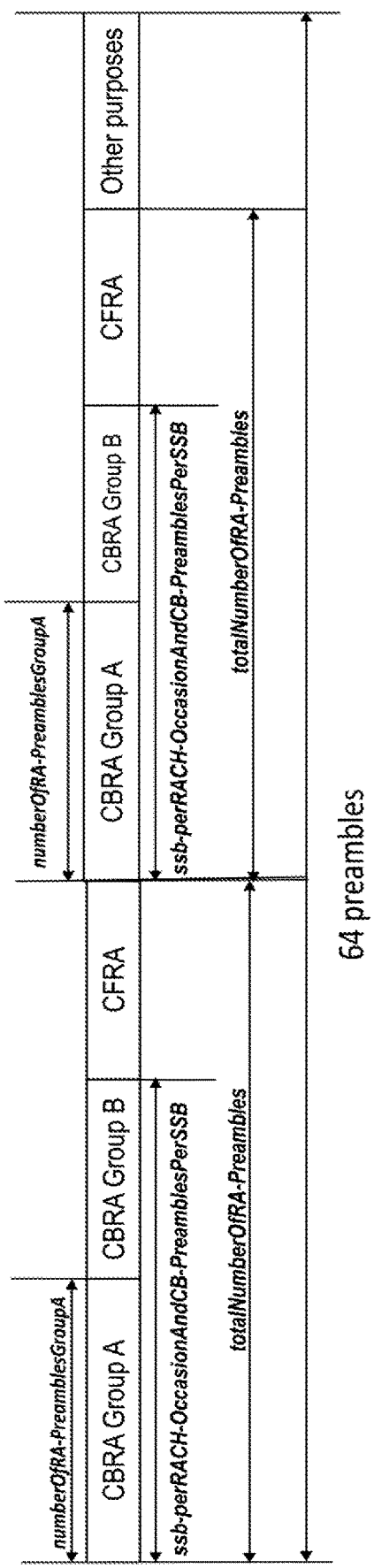

FIGS. 1C-1D are diagrams illustrating examples of preamble allocation according to some embodiments of the present disclosure. As shown in FIGS. 1C-1D, the maximum of 64 preambles may be configured per PRACH occasion in NR and the preamble allocation may be per SSB for each PRACH occasion. The preamble allocation for one PRACH occasion in FIG. 1C is only mapped to one SSB, while the preamble allocation for one PRACH occasion in FIG. 1D is mapped to two SSBs. The preambles for contention based random access (CBRA) per SSB may have two preamble groups, i.e. group A and group B per SSB. For each SSB, the preambles not used for CBRA may be used for contention free random access (CFRA), and some remaining preambles for other purposes may be available when total number of preambles configured per PRACH occasion is less than 64.

Different PRACH configuration schemes may be specified for frequency range 1 (FR1) paired spectrum, FR1 unpaired spectrum and frequency range 2 (FR2) with unpaired spectrum, respectively. The specified PRACH configuration may be maintained in a PRACH configuration table. The time resource and preamble format for PRACH transmission may be configured by a PRACH configuration index, which indicates a row in a PRACH configuration table, e.g., as specified in 3GPP TS 38.211 V16.1.0, Tables 6.3.3.2-2, 6.3.3.2-3, 6.3.3.2-4 for FR1 paired spectrum, FR1 unpaired spectrum and FR2 with unpaired spectrum, respectively (where the entire content of this technical specification is incorporated into the present disclosure by reference). As an example, at least part of PRACH configuration for preamble format 0 for FR1 unpaired spectrum is shown in Table 1.

TABLE 1

| PRACH Configuration Index | Preamble format | $n_{SFN}$ mod $x = y$ | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | — | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In Table 1, the value of x indicates the PRACH configuration period in number of system frames, and the value of y indicates the system frame within each PRACH configuration period on which the PRACH occasions are configured. For instance, if y is set to 0, then it means that PRACH occasions are only configured in the first frame of each PRACH configuration period. The value in the column "Subframe number" tells which subframes are configured with PRACH occasions. The value in the column "Starting symbol" is the symbol index. Determination of time resources for PRACH transmission for FR2 is similar, except that 60 kHz slots are used instead of subframes.

In the case of time division duplexing (TDD), semi-statically configured DL parts and/or actually transmitted SSBs can override and invalidate some time-domain PRACH occasions defined in the PRACH configuration table. More specifically, PRACH occasions in the UL part are always valid, and a PRACH occasion within a certain part (e.g., a part with flexible symbols within a NR slot) is valid as long as it does not precede or collide with an SSB in the RACH slot and there are at least N symbols after the DL part and the last symbol of an SSB. For example, N may be set as 0 or 2, depending on the PRACH format and subcarrier spacing.

FIG. 1E is a diagram illustrating an exemplary information element (IE) for RA according to an embodiment of the present disclosure. The exemplary IE may include various parameters for RACH configuration according to different network scenarios. For example, in the frequency domain, a NR system may support multiple frequency-multiplexed PRACH occasions on the same time-domain PRACH occasion. This is mainly motivated by the support of analog beam sweeping in the NR system such that the PRACH occasions associated to one SSB are configured at the same time instance but different frequency locations. The starting position in the frequency may be indicated by the higher-layer parameter msg1-FrequencyStart in a system information block such as SIB1, and the number of consecutive PRACH occasions frequency-division multiplexed (FDMed) in one time instance may be configured by the higher-layer parameter msg1-FDM in SIB1. The number of PRACH occasions FDMed in one time domain PRACH occasion may be 1, 2, 4, or 8.

As mentioned in 3GPP TS 38.331 V16.0.0 (where the entire content of this technical specification is incorporated into the present disclosure by reference), the higher-layer parameters msg1-FDM and msg1-FrequencyStart may be defined as below:

msg1-FDM: The number of PRACH transmission occasions FDMed in one time instance.

msg1-FrequencyStart: Offset of lowest PRACH transmission occasion in frequency domain with respective to physical resource block (PRB) 0. The value is configured so that the corresponding RACH resource is entirely within the bandwidth of the UL bandwidth part (BWP).

Figure 1F:
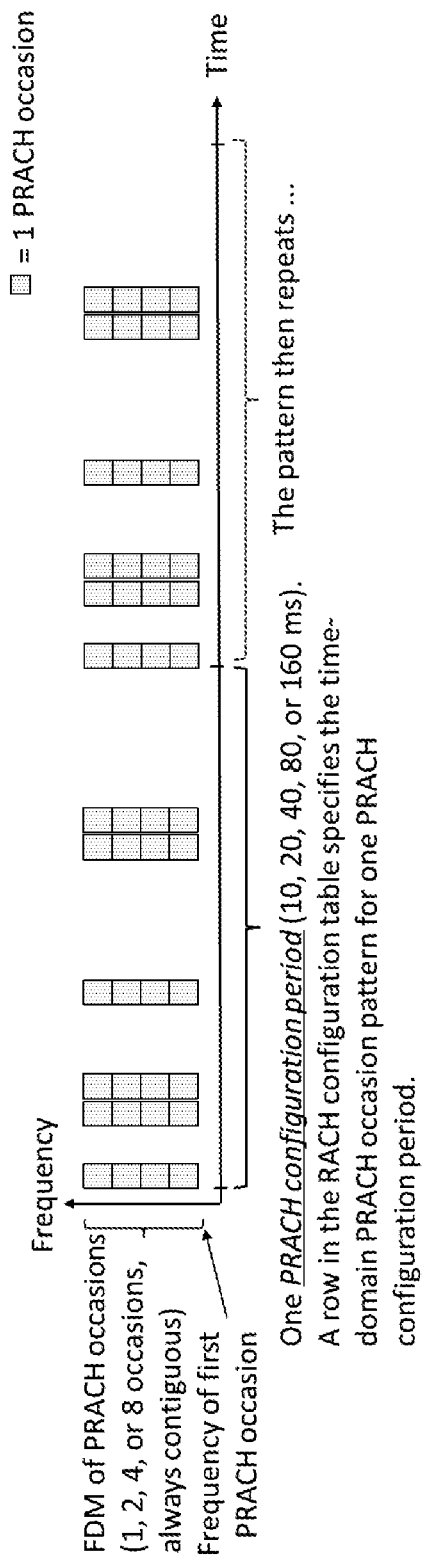
FIG. 1F is a diagram illustrating an exemplary PRACH configuration according to an embodiment of the present disclosure.

FIG. 1F is a diagram illustrating an exemplary PRACH configuration according to an embodiment of the present disclosure. As shown in FIG. 1F, the number of PRACH occasions FDMed in one time domain PRACH occasion may be 1, 2, 4, or 8, and the PRACH configuration period may be 10 ms, 20 ms, 40 ms, 80 ms or 160 ms. As mentioned previously, a row in a PRACH/RACH configuration table can specify the time-domain PRACH occasion pattern for one PRACH configuration period. According to an exemplary embodiment, there may be up to 64 sequences that can be used as RA preambles per PRACH occasion in each cell. The RRC parameter such as totalNumberOfRA-Preambles can be used to determine how many of these 64 sequences are used as RA preambles per PRACH occasion in each cell. The 64 sequences may be configured by including firstly all the available cyclic shifts of a root Zadoff-Chu sequence, and secondly in the order of increasing root index, until 64 preambles have been generated for the PRACH occasion.

In accordance with some exemplary embodiments, the PRACH occasions for two-step RA may be either separately configured in a similar way as for four-step RA (also known as Type-2 random access procedure with separate configuration of PRACH occasions with Type-1 random access procedure), or shared with four-step RA (also known as Type-2 random access procedure with common configuration of PRACH occasions with Type-1 random access procedure) in which case different sets of preamble IDs may be used, as described in section 8.1 of 3GPP TS 38.213 V16.1.0.

In accordance with some exemplary embodiments, a RA procedure such as two-step RA and four-step RA may be performed in two different ways, e.g., contention-based (CBRA) and contention-free (CFRA). The difference is in that which preamble is used. In the contention-based case, a UE may randomly select a preamble from a range of preambles. For this case, there may be a collision if two UEs select the same preamble. In the contention-free case, a UE may be given a specific preamble by the network, which ensures that two UEs will not select the same preamble, thus the RA is collision-free. The CBRA may be typically used when a UE is in an idle/inactive state and wants to go to the connected state, while the CFRA may be used for performing handover and/or in beam failure procedures.

In order to support an early CSI request and report process, a BS may need to know a UE's capability of supporting an early CSI report. If the UE does not support the early CSI report capability, the UE may not respond to an early CSI request from the BS. If the BS fails to receive the early CSI report from the UE, the BS may not be able to tell if it is due to the UE's incapability or the report is lost. Thus, the BS may not handle the case correspondingly. Furthermore, when UEs that are and are not capable of transmitting CSI reports share the same set of RA preambles, the BS may not be able to determine whether a Msg3 or MsgA transmitted by a UE includes an early CSI report, since the BS does not know if the UE is capable of transmitting the early CSI report. Therefore, a flexible scheme for triggering the early CSI report may be needed instead of enabling the early CSI report indiscriminately.

Various exemplary embodiments of the present disclosure propose a solution for RA, which can enable the support and/or presence of an early CSI report to be determined by a BS, even if a UE's capability to transmit the early CSI report is not known by the BS in advance. In addition, according to various embodiments, early CSI reporting may be conditionally or selectively enabled from a UE to a BS, so that the network may know whether the early CSI report is to be reported in an UL channel during a RA procedure or before the normal CSI report is available. In this way, the CSI reporting may be implemented during the RA procedure with enhanced resource utilization and improved transmission efficiency and flexibility.

In accordance with some exemplary embodiments, if a UE can report early CSI to a BS, the UE may use a reserved RACH preamble or RACH occasion, or a RACH type specific to early CSI reporting to implicitly indicate the support and/or presence of an early CSI report to the BS. In the case that the UE does not support early CSI reporting, the UE may use other RACH preambles, RACH occasions, or RACH types. According to an exemplary embodiment, the UE may use a single set of PRACH preambles regardless of the support and/or presence of an early CSI report, but indicate the support and/or presence of the early CSI report with a channel identifier (ID) in a protocol header. The UE's implicit indication of its early CSI report capability may enable the BS to request a conditional early CSI report from the particular capable UE. The BS may know to expect the early CSI report from which UE. Otherwise, the BS may trigger a universal early CSI report with respect to all UEs in the cell, since the BS may not be able to expect which UE may send an early CSI report.

Figure 2A:
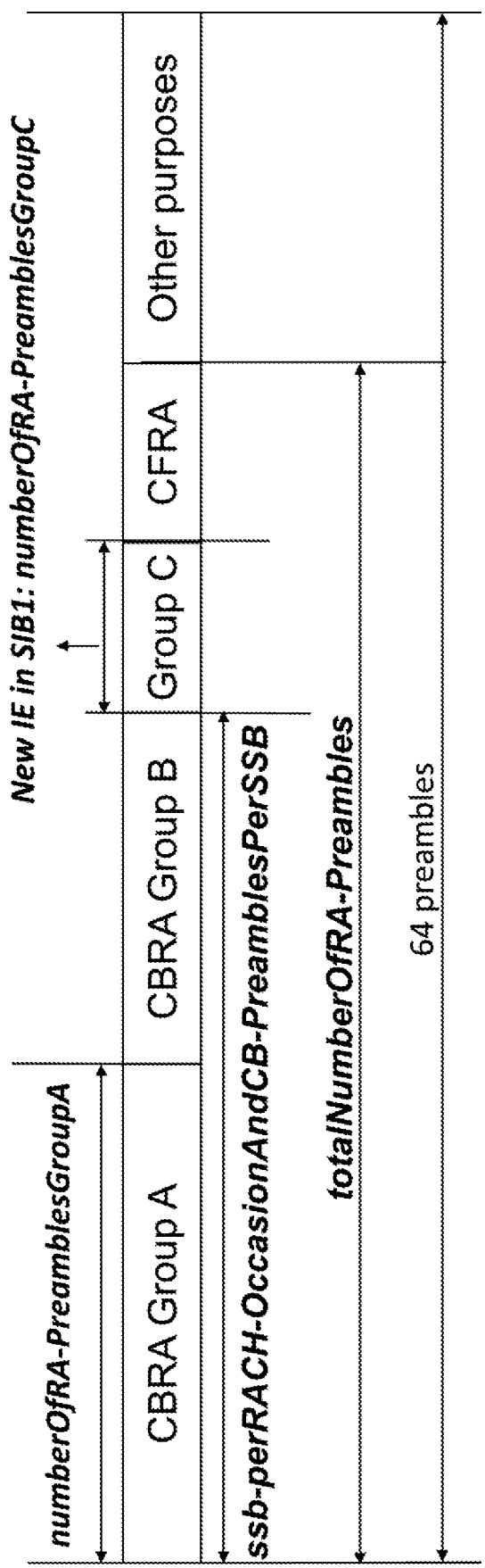
FIG. 2A is a diagram illustrating exemplary preambles in a synchronization signal and physical broadcast channel block (which is also known as an SS/PBCH block or SSB for short) per PRACH occasion according to an embodiment of the present disclosure.

FIG. 2A is a diagram illustrating exemplary preambles in a SSB per PRACH occasion according to an embodiment of the present disclosure. In the exemplary embodiment, a PRACH preamble group may be used to indicate the support and/or presence of a CSI report in a message from a UE. As an example, the preamble group may be the set of preambles as defined in 3GPP Release15 for Group A or Group B (as shown in FIG. 1C and FIG. 1D). Alternatively or additionally, a new preamble group such as Group C may be defined. The new preamble group may be part of preambles that are configured in addition to Group A and Group B, as shown in FIG. 2A. In an embodiment, the new preamble group may be a subset of preambles originally used for CFRA or other purposes.

In accordance with some exemplary embodiments, the network can easily determine whether an early CSI report is transmitted by a UE based on the ID of the preamble transmitted by the UE. As an example, the UE that is capable of reporting early CSI can identify Group C preambles, e.g. according to configuration in SIB1. The Group C configuration may not be used by UEs capable of only 3GPP Release 15 operations or those that do not use Group C preambles for CBRA. Group C preambles may be configured in several ways. For example, a parameter numberofRA-PreamblesGroupC (e.g. as a new IE configured in SIB1) may be used to indicate Group C preambles that may be configured as additional CBRA preambles. In an embodiment, a portion of the preambles initially used for CFRA may be configured as Group C preambles. As shown in FIG. 2A, Group C preambles may include the beginning preambles of those initially allocated to CFRA. It can be appreciated that Group C preambles may include any of preambles per SSB per RACH occasion. For example, Group C preambles may include the middle and/or the ending preambles initially configured for CFRA. Group C preambles may use some quota from other purposes, or even reuse a part of Group A/Group B preambles. Alternatively or additionally, Group C preambles may be located between CBRA Group A and CBRA Group B.

In accordance with some exemplary embodiments, for the four-step RACH, a gNB may firstly configure SIB1 with Group C preambles for a UE that can report early CSI. The CSI resource settings and CSI reporting settings for an early CSI report may also be configured in SIB1. Then, the UE which can support early CSI may send a preamble of Group C to the gNB. In some embodiments, Group C may be divided into Group C1 and Group C2. Group C1 may be used if the size of Msg3 is below a threshold. Otherwise, Group C2 may be used. The gNB may send Msg2 RAR including a CSI report request for an early CSI measurement. In some embodiments, the network may also transmit an aperiodic CSI-RS that the UE may use for the early CSI measurement. Alternatively or additionally, the UE may use an SSB or a periodic CSI-RS for the early CSI measurement. Then the UE may report CSI to the gNB in Msg3.

In accordance with some exemplary embodiments, when the early CSI report is activated in SIB1 and Group C is not configured in SIB1, the UE may use Group B to implicitly indicate the UE's support of the early CSI report.

In accordance with some exemplary embodiments, for the two-step RACH, the gNB may firstly configure SIB1 with Group C preambles for the UE that can report early CSI. The periodic CSI-RS settings and aperiodic CSI reporting settings may also be configured in SIB1. Since the UE may need CSI-RS information before MsgA transmission, the periodic CSI-RS transmission may be needed in some embodiments. The UE capable of reporting early CSI may measure the periodic CSI-RS and determine an early CSI report. The UE may transmit the MsgA preamble selected from Group C, and a RRC setup request and the early CSI report in MsgA PUSCH. Then the gNB may send the MsgB PDSCH to the UE. In an embodiment, the gNB may use the early CSI report for link adaptation (LA) of the MsgB PDSCH, thereby improving the MsgB PDSCH reliability and/or spectral efficiency.

In accordance with some exemplary embodiments, a UE capable of CSI reporting as part of an initial access procedure may use a different RA preamble in the case that CSI is reported, compared with the case of not reporting the CSI. The UE may indicate the support and/or presence of the CSI report in a channel according to determining that the CSI report is to be transmitted in the channel, in which case the UE may select and transmit a preamble from a first set of RA preambles and transmit a channel that contains the CSI report. Upon determining that the CSI report is not to be transmitted in the channel, the UE may select and transmit a preamble from a second set of RA preambles and transmit a channel that does not contain the CSI report.

In accordance with some exemplary embodiments, for two-step RACH, a preamble from Group C may be selected, in the case of an MsgA PUSCH with expected payload size larger than a threshold configured by RRC signaling. In accordance with another exemplary embodiment, for four-step RACH, the selection of preamble Group C may be required to have an Msg3 with expected payload size larger than a threshold configured by RRC signaling.

In accordance with some exemplary embodiments, if the gNB receives a preamble from Group C, then the gNB may allocate a larger UL grant (in Msg2) for Msg3 in four-step RACH or allocate large PO (PUSCH occasion) size for MsgA PUSCH in two-step RACH. In this way, the CSI report may be included in a MAC PDU of Msg3 PUSCH for the four-step RACH or MsgA PUSCH for the two-step RACH. As an example for the four-step RACH, the gNB may normally provide an UL grant of 72 bits for Msg3, if the gNB receives a preamble from Group A or Group B. In the case that the gNB receives a preamble from Group C, the gNB may allocate an UL grant of 88 bits or even larger depending upon how many metrics/measurements reports it wants to obtain from the UE.

In accordance with some exemplary embodiments, the early CSI report may be indicated by a subset of RACH occasions (ROs) where a preamble associated with the early CSI report may be transmitted. The subset of ROs may be determined per SSB. For example, a UE capable of early CSI reporting may be provided a number N of SSBs associated with one RO, and if N<1, one SSB is mapped to 1/N valid ROs. A subset of ROs may be reserved for the early CSI report capable UEs. In this case, the network may easily determine whether an early CSI report may be received, based on the RO in which the preamble is received. According to an embodiment, there may be no need to configure additional ROs.

In accordance with some exemplary embodiments, the UE capability of reporting early CSI may be indicated by a separately configured RO for early CSI in frequency domain and/or time domain. In this case, the network may easily determine whether an early CSI report may be received, based on whether the RO with a preamble received is the separately configured RO or a legacy RO. In some embodiments, additional ROs may be configured for UEs reporting early CSI while keeping the capacity of ROs for UEs not reporting early CSI.

In accordance with some exemplary embodiments, the RO configured for early CSI reporting may be indicated by time and/or frequency information. For example, in the frequency domain, SIB1 may be used to indicate which additional RO(s) on top of the ROs configured for UEs not capable of reporting early CSI. In the time domain, a separate PRACH configuration index may be used, e.g. in SIB1, to configure a separate set of ROs for UEs capable of reporting early CSI.

In accordance with some exemplary embodiments, the support and/or presence of the CSI report in a message from the UE may be indicated by an ID in a protocol header. The CSI report may be included in a MAC PDU such that a MAC subheader with a new LCID may be defined. A flexible payload for this MAC subheader may be defined, which may contain various measurements and depend upon the UL grant size. The network may indicate the priority order in a SIB which the UE follows while reporting in Msg3.

Figure 2B:
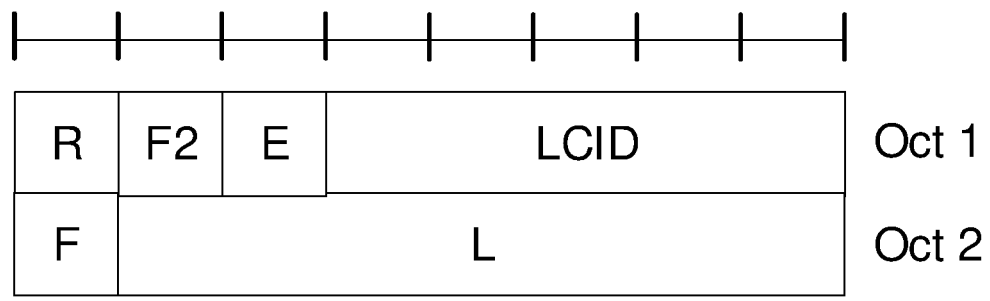
FIG. 2B is a diagram illustrating an exemplary control element for medium access control (MAC CE) according to an embodiment of the present disclosure.

FIG. 2B is a diagram illustrating an exemplary MAC CE according to an embodiment of the present disclosure. In the exemplary MAC CE, the L field may be 7-bit long and used to represent how many bytes of data may be provided. Basically, a variable-sized MAC CE in bytes may be defined, such that the size may depend upon the UL grant that the network provides. In an embodiment, the network may provide a larger UL grant to obtain multiple measurements/metrics from the UE, for example, including but not limited to: reference signal received power (RSRP), reference signal received quality (RSRQ), signal to interference plus noise ratio (SINR), channel quality information (CQI), precoder matrix, rank indicator, best beam index, spatial relation information, etc. It can be appreciated that alternative or in addition to the CSI-RS, the early CSI may also be reported based on an SSB.

According to the embodiment where the new LCID is used, the network can determine whether the CSI report is present or absent in the uplink-shared channel (UL-SCH), e.g. according to whether the LCID is present or absent. In this case, the same RA preamble may be used regardless of whether an early CSI report is present or not, since the RA preamble may not be needed to indicate the presence of the CSI report. This can save RA preamble overhead, although it may require extra overhead in the UL-SCH. In an embodiment, if the CSI report is not present and there is no enough other data to fill the resource allocation for Msg3 or MsgA, then the UE may zero pad the UL-SCH.

Therefore, in some embodiments, a UE capable of CSI reporting in a RA procedure may use one set of RA preambles regardless of whether it transmits an early CSI report or not. The UE may select and transmit a preamble from the set of RA preambles. Upon determining that a CSI report needs to be transmitted in a channel, the UE may transmit an UL-SCH that contains the CSI report, where the support and/or presence of the CSI report may be indicated by an ID in a protocol header carried in the UL-SCH.

In accordance with some exemplary embodiments, the network may configure the UE such that the number of bits in an UL-SCH in an MsgA or Msg3 may be greater than the number of bits allocated for the UL-SCH. In such cases, the UE may need to drop the CSI report in order to fit the MsgA or Msg3 payload into the UL-SCH. Therefore, in some embodiments where the support and/or presence of the CSI report may be indicated by an ID in a protocol header, the UE can determine whether the CSI report needs to be transmitted, according to whether the number of bits of a message that includes the CSI report is greater than the number of bits allocated for the UL-SCH. If the number of bits of the message including the CSI report is greater, the UE may transmit the message without the CSI report.

In accordance with some exemplary embodiments, the UE capability of reporting CSI may be indicated by the RA type, e.g. a two-step RA type, a four-step RA type, CBRA or CFRA. According to an embodiment, the UE may report early CSI when a two-step RA type is selected, while the UE may not be expected to report early CSI when a four-step RA type is selected. This is good for quick two-step RA since a reliable MsgB transmission can be facilitated using the early CSI reported in MsgA PUSCH. The network may configure that the UE supporting early CSI request/report may only use one type of RACH procedure. So, whenever the UE performs the RA based upon that type of RACH procedure, it may to a certain degree mean that this UE supports early CSI request/report.

In accordance with some exemplary embodiments, one or more of the following metrics or factors may be used to implicitly indicate early CSI:
   The UE's RSRP is below a certain threshold: True/False;
   The UE is in poor coverage/cell border area: True/False; and
   The camped SSB index is the best SSB index: True/False.
   According to an exemplary embodiment, Group C preambles indicated by the parameter numberofRA-Preambles-GroupC may be further partitioned in different groups such as Group C(i) and Group C(ii). If the result of at least one of the above metrics/factors is "True", then the UE may select a preamble from Group C(i), otherwise, the UE may select a preamble from Group C(ii). A benefit of this embodiment is that an explicit CSI report may not be required on PUSCH or physical uplink control channel (PUCCH). The UE may indicate the CSI (e.g., the True/False outcome of the one or more metrics/factors) by using Msg1 or MsgA in the RA procedure. In this way, the overhead of the explicit CSI report may be avoided, and the network and UE reporting complexity may be reduced.

In accordance with some exemplary embodiments, if the UE indicates that the camped/current SSB index is not the best one, then based upon this result, the gNB may take a specific action, for example, further checking the received power of the preamble. If the received power of the preamble is below a threshold, then the gNB may change the transmission (Tx) beam of Msg2 or Msg4.

In accordance with some exemplary embodiments, if the UE is in poor coverage, e.g. at the cell edge, and/or the RSRP is below a threshold, then the gNB may transmit the Msg2 with higher power or repeat the Msg2 for a certain duration.

In accordance with some exemplary embodiments, the CSI report may be included in a RRC message transmitted by Msg3 PUSCH or MsgA PUSCH. As an example, when the network provides a larger UL grant or PUSCH occasion and indicates that it supports early CSI reports from UEs via either SIB1 or Msg2/RAR, the UE may also use a new RRC message (e.g. carried in Msg3, etc.). The RRC message may consist of several metrics for which the UE may perform measurements in idle mode (e.g. prior to transmitting the preamble). According to an embodiment, the new Msg3 or MsgA RRC message may be termed for example: RRCIdleModeMeasurentReport or RRCSetupAndMeasurementReport, which may consist of current RRC message for RRCSetupRequest plus measurement.

FIG. 2C is a diagram illustrating an exemplary RRC message according to an embodiment of the present disclosure. As shown in FIG. 2C, the exemplary RRCSetupAndMeasurementRequest message may include a report of measurements, e.g. RSRP, RSRQ, best beam index, precoding matrix indicator/rank indicator, CQI, etc. The RRCSetupAndMeasurentReport message may be used to request the establishment of an RRC connection and provide the measurements which are made prior to sending Msg3 by the UE. As an example, Table 2 shows descriptions of some IE fields of RRCSetupAndMeasurentReport message.

TABLE 2

RRCSetupRequest-IEs field descriptions establishmentCause
Provides the establishment cause for the RRCSetupRequest in accordance with the information received from upper layers. The gNB is not expected to reject an RRCSetupRequest due to unknown cause value being used by the UE.
ue-Identity
UE identity included to facilitate contention resolution by lower layers.
measurementReport
UE provides various measurements in the msg3 that the network lists in SIB.

In accordance with some exemplary embodiments, the gNB may configure the UE to report CSI in an RRC message, and the UE may indicate whether it is capable of reporting the CSI in the RRC message, e.g. by selecting a preamble, a RO, an identifier in a protocol header, a RA type, etc. specific to the early CSI capability. If the UE is not capable of reporting the CSI in the RRC message, and/or if it has a larger resource allocation than needed to transmit the RRC message, then the UE may zero pad the UL-SCH.

In accordance with some exemplary embodiments, the UE may further determine when to transmit the early CSI report according to one or more of:
   receiving control signaling identifying a first set of RA preambles (or ROs) to be used with early CSI transmission in addition to a second set of RA preambles (or ROs) that is not for use with early CSI;
   determining that a signal quality measurement meets a requirement sufficient to transmit the early CSI; and
   determining that there is sufficient room in an UL-SCH to contain a CSI report to be carried in higher layers, and including the CSI report in the UL-SCH only when there is sufficient room.

In accordance with some exemplary embodiments, a CSI request may be implicitly indicated by downlink signaling in a response message to an MsgA PUSCH. For example, the downlink signaling may include one or more of:
   the UL grant for the transmission of a CSI report; and
   the UL grant for the retransmission of the MsgA PUSCH.

It can be realized that parameters, variables and settings related to the signaling transmission and resource configuration described herein are just examples. Other suitable parameter settings, the associated configurations and the specific values thereof may also be applicable to implement the proposed methods.

According to various embodiments described above, a UE may indicate whether an early CSI report is supported or present in a channel by using different preambles. Upon determining that the early CSI report needs to be transmitted in the channel, the UE may select and transmit a preamble from a first set of RA preambles, and transmit a channel that contains the early CSI report to a gNB. Upon determining that the early CSI report is not be transmitted in the channel, the UE may select and transmit a preamble from a second set of RA preambles, and transmit a channel that does not contain the early CSI report to the gNB.

In accordance with some exemplary embodiments, the UE may determine whether to transmit the early CSI report according to one or more criteria. For example, the UE may determine that the early CSI report needs to be transmitted to the gNB, if the UE receives control signaling identifying the second set of RA preambles in addition to the first set of RA preambles, and/or if the UE determines that a signal quality measurement meets a certain requirement, and/or if the UE determines that the UE may transmit a PUSCH associated with the RA preamble that identifies the physical layer resource occupied by the PUSCH, etc.

In accordance with some exemplary embodiments, the first set of RA preambles may be contained in one or more ROs, all of which do not contain preambles from the second set of RA preambles. According to an embodiment, a first RA configuration and a second RA configuration may each identify only one of the first and the second set of RA preambles, respectively.

In accordance with some exemplary embodiments, UEs may use the same set of preambles regardless of whether early CSI is reported, but indicate the support and/or presence of an early CSI report with a specific LCID. For example, a UE may select and transmit a preamble from a set of RA preambles. Upon determining that the early CSI report needs to be transmitted in the channel, the UE may transmit an UL-SCH that contains the early CSI report, where the presence of the early CSI report may be indicated by an ID in a protocol header carried in the UL-SCH In accordance with some exemplary embodiments, a UE may drop the early CSI report if it does not fit in the allocated resources. For example, the UE may determine that the early CSI report needs to be transmitted, however, if the UE determines that the number of bits of a message which includes the early CSI report to be transmitted in the UL-SCH is greater than the number of bits allocated for the UL-SCH, then the UE may transmit the message without the early CSI report to the gNB.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 3A:
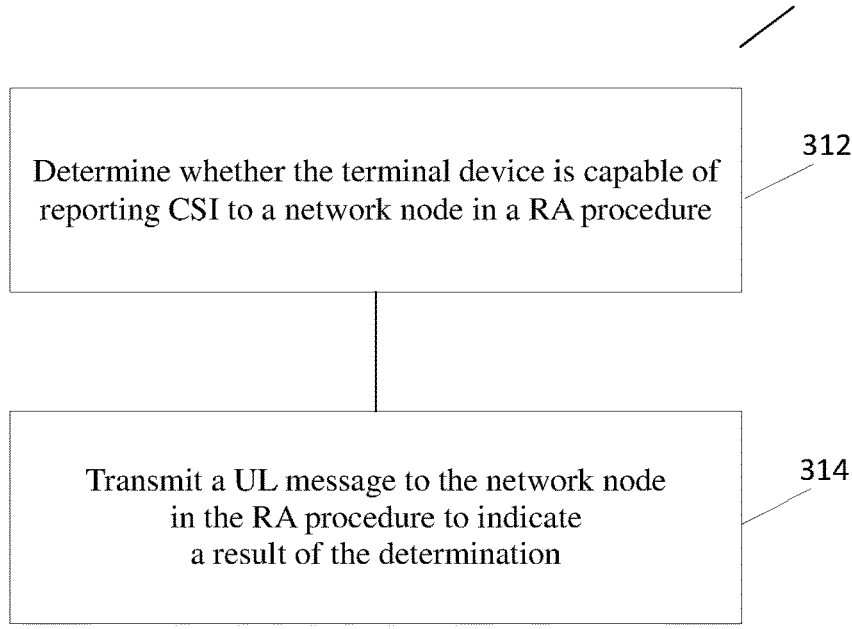
FIG. 3A is a flowchart illustrating a method according to some embodiments of the present disclosure.

FIG. 3A is a flowchart illustrating a method 310 according to some embodiments of the present disclosure. The method 310 illustrated in FIG. 3A may be performed by a terminal device or an apparatus communicatively coupled to the terminal device. In accordance with an exemplary embodiment, the terminal device such as a UE may be configured to connect to a network node such as a gNB, for example, by performing a RA procedure (e.g., a two-step or four-step RA procedure).

According to the exemplary method 310 illustrated in FIG. 3A, the terminal device may determine whether the terminal device is capable of reporting CSI to a network node in a RA procedure, as shown in block 312. Then the terminal device may transmit an UL message (e.g. Msg1 or MsgA, etc.) to the network node in the RA procedure to indicate a result of the determination, as shown in block 314. In accordance with an exemplary embodiment, the UL message may indicate whether the terminal device is capable of reporting the CSI to the network node in the RA procedure, for example, by using a preamble, a RO, an identifier (e.g. LCID, etc.) in a protocol header and/or a RA type, etc.

In accordance with an exemplary embodiment, the UL message may include a preamble selected from a predetermined group of preambles (e.g. Group C preambles as described with respect to FIG. 2A). The predetermined group of preambles may be configured for one or more terminal devices capable of reporting CSI during RA. In an embodiment, this preamble (e.g. a Group C preamble, etc.) may be used to indicate that the terminal device is capable of reporting the CSI to the network node in the RA procedure. In another embodiment, the preamble (e.g. a preamble from Group C(i) or Group C(ii), etc.) may be further used to indicate at least part of the CSI to the network node.

In accordance with an exemplary embodiment, the predetermined group of preambles may be informed to the terminal device by a first signaling from the network node. As an example, the first signaling may include one or more parameters for the predetermined group of preambles, e.g. the number of the predetermined group of preambles, and/or one or more indicators (such as identifiers or indexes, etc.) of the predetermined group of preambles, etc.

In accordance with an exemplary embodiment, the predetermined group of preambles may be divided into two or more subgroups of preambles (e.g. Group C1 and Group C2 as described with respect to FIG. 2A). The two or more subgroups of preambles may be respectively associated to UL-SCH transmissions with different payload sizes.

In accordance with an exemplary embodiment, the UL message may include a preamble in a RO selected from a predetermined set of ROs. The predetermined set of ROs may be reserved or configured for one or more terminal devices capable of reporting CSI during RA. In an embodiment, the RO may be used to indicate that the terminal device is capable of reporting the CSI to the network node in the RA procedure. In another embodiment, the RO may be further used to indicate at least part of the CSI to the network node.

In accordance with an exemplary embodiment, the predetermined set of ROs may be informed to the terminal device by a second signaling from the network node. As an example, the second signaling may include frequency information of the predetermined set of ROs, and/or time information of the predetermined set of ROs, etc. It can be appreciated that the first signaling for the predetermined group of preambles and the second signaling for the predetermined set of ROs may be the same or different signaling.

In accordance with an exemplary embodiment, the UL message may include an identifier in a protocol header. For example, the identifier may be an LCID, and the protocol header may be a header of a MAC PDU included in the UL message. In an embodiment, this identifier may be used to indicate that the terminal device is capable of reporting the CSI to the network node in the RA procedure. In another embodiment, the identifier may be further used to indicate at least part of the CSI to the network node.

In accordance with an exemplary embodiment, the UL message may be associated with a RA type. For instance, the RA type may comprise at least one of: two-step RA, four-step RA, CBRA and CFRA. In an embodiment, the RA type may be used to indicate that the terminal device is capable of reporting the CSI to the network node in the RA procedure. In another embodiment, the RA type may be further used to indicate at least part of the CSI to the network node.

In accordance with an exemplary embodiment, the UL message may further indicate whether resources no less than a threshold are required for an UL-SCH transmission of the terminal device in the RA procedure. For example, the resources required for an UL-SCH transmission with a CSI report may be more than the resources required for an UL-SCH transmission without a CSI report.

In accordance with an exemplary embodiment where the terminal device is capable of reporting the CSI, the terminal device may receive a request for the CSI from the network node in the RA procedure, and determine whether to report the CSI to the network node in the RA procedure.

In accordance with an exemplary embodiment, the determination of whether to report the CSI to the network node in the RA procedure may be based on one or more of:
  whether downlink signaling is received by the terminal device from the network node to activate the reporting of the CSI;
  whether a measurement on signal quality of the terminal device meets a first requirement (e.g. the RSRP is higher than a threshold, etc.); and
  whether resource allocation for reporting the CSI meets a second requirement (e.g. there is sufficient room or resource to report CSI, etc.).

In accordance with an exemplary embodiment, the downlink signaling may indicate a predetermined group of preambles which are configured for terminal devices capable of reporting CSI during RA. Alternatively or additionally, the downlink signaling may further indicate a predetermined set of ROs which are reserved or configured for terminal devices capable of reporting CSI during RA.

In accordance with an exemplary embodiment, the terminal device may report the CSI to the network node in the RA procedure, in response to determining to report the CSI to the network node. According to an embodiment, the CSI may be reported at least partly to the network node by a RRC message in an UL-SCH. Alternatively or additionally, the CSI may be reported at least partly to the network node by a MAC PDU in an UL-SCH.

In accordance with an exemplary embodiment, the terminal device may transmit an UL-SCH without the CSI to the network node in the RA procedure, in response to determining not to report the CSI to the network node. In this case, the network node may not receive the CSI in the RA procedure, even if the terminal device is capable of CSI reporting and the network node sends a request for the CSI to the terminal device.

Figure 3B:
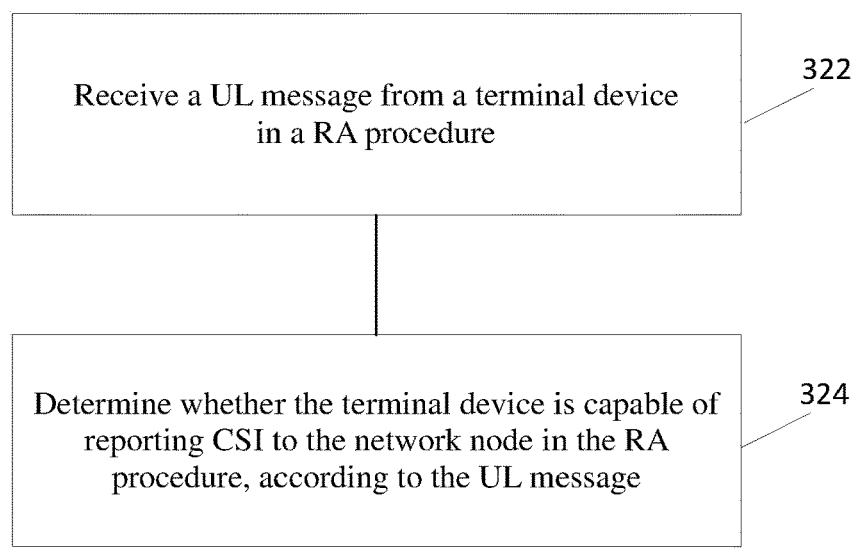
FIG. 3B is a flowchart illustrating another method according to some embodiments of the present disclosure.

FIG. 3B is a flowchart illustrating a method 320 according to some embodiments of the present disclosure. The method 320 illustrated in FIG. 3B may be performed by a network node or an apparatus communicatively coupled to the network node. In accordance with an exemplary embodiment, the network node may comprise a base station such as a gNB. The network node may be configured to communicate with one or more terminal devices such as UEs which can connect to the network node by performing a RA procedure (e.g., a two-step or four-step RA procedure).

According to the exemplary method 320 illustrated in FIG. 3B, the network node may receive an UL message from a terminal device (e.g. the terminal device as described with respect to FIG. 3A) in a RA procedure, as shown in block 322. According to the UL message, the network node may determine whether the terminal device is capable of reporting CSI to the network node in the RA procedure, as shown in block 324.

It can be appreciated that the steps, operations and related configurations of the method 320 illustrated in FIG. 3B may correspond to the steps, operations and related configurations of the method 310 illustrated in FIG. 3A. It also can be appreciated that the UL message received by the network node according to the method 320 may correspond to the UL message transmitted by the terminal device according to the method 310. Thus, the UL message as described with respect to FIG. 3A and FIG. 3B may have the same or similar contents and/or feature elements. Correspondingly, the CSI reporting capability of the terminal device in the RA procedure as described with respect to FIG. 3A and FIG. 3B may be indicated by means of the same or similar parameter(s) and/or rule(s).

In accordance with an exemplary embodiment, the network node may allocate resources to the terminal device for an UL-SCH transmission in the RA procedure, according to the UL message. For example, the network node may allocate more resources for an UL-SCH transmission to a terminal device capable of reporting CSI during RA than a terminal device not capable of reporting CSI during RA.

In accordance with an exemplary embodiment, the network node may transmit a request for the CSI to the terminal device in the RA procedure, in response to determining that the terminal device is capable of reporting the CSI. As described with respect to FIG. 3A, the terminal device may not respond to this request for the CSI due to various reasons (e.g. poor signal quality, insufficient transmission resource, etc.). Thus, the CSI may be selectively reported to the network node by the terminal device in the RA procedure.

In accordance with an exemplary embodiment, the network node may detect the CSI selectively reported by the terminal device in the RA procedure. According to an embodiment, the CSI may be reported at least partly to the network node by a RRC message and/or a MAC PDU in an UL-SCH.

According to various embodiments of the methods 310 and 320, a UE capable of reporting early CSI may use the reserved or configured RA preamble/RO/RA type to implicitly indicate its capability of reporting early CSI to the network, and a UE not capable of reporting early CSI may use other RA preamble/RO/RA type. For the UE capable of reporting early CSI, a gNB may assume that the early CSI is reported in early UL channels, e.g. MsgA PUSCH or Msg3 PUSCH, during the RA procedure and try to receive it.

Figure 4A:
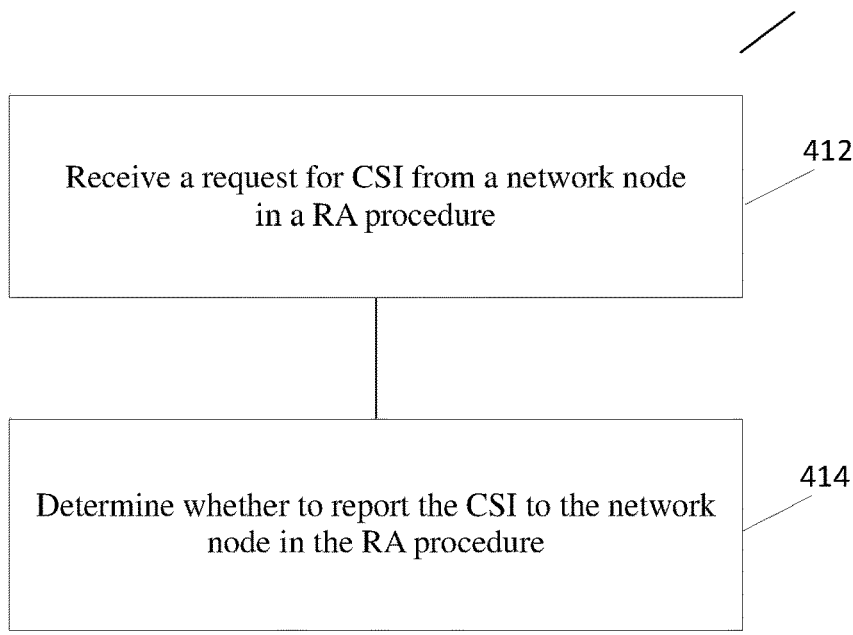
FIG. 4A is a flowchart illustrating yet another method according to some embodiments of the present disclosure.

FIG. 4A is a flowchart illustrating a method 410 according to some embodiments of the present disclosure. The method 410 illustrated in FIG. 4A may be performed by a terminal device or an apparatus communicatively coupled to the terminal device. In accordance with an exemplary embodiment, the terminal device such as a UE may be configured to connect to a network node such as a gNB, for example, by performing a RA procedure (e.g., a two-step or four-step RA procedure).

According to the exemplary method 410 illustrated in FIG. 4A, the terminal device may receive a request for CSI from a network node in a RA procedure, as shown in block 412. In accordance with an exemplary embodiment, the terminal device may determine whether to report the CSI to the network node in the RA procedure, as shown in block 414. In an embodiment, the terminal device as described with respect to FIG. 4A may indicate the support and/or presence of an early CSI report in an UL channel to the network node, e.g. by performing the method 310. In another embodiment, the terminal device as described with respect to FIG. 4A may not indicate the support and/or presence of an early CSI report in an UL channel to the network node.

In accordance with an exemplary embodiment, the determination of whether to report the CSI to the network node in the RA procedure may be based on one or more of:
whether downlink signaling is received by the terminal device from the network node to activate the reporting of the CSI;
whether a measurement on signal quality of the terminal device meets a first requirement; and
whether resource allocation for reporting the CSI meets a second requirement.

In accordance with an exemplary embodiment, the downlink signaling may indicate one or more of:
a predetermined group of preambles which are configured for terminal devices capable of reporting CSI during RA; and
a predetermined set of ROs which are reserved or configured for terminal devices capable of reporting CSI during RA.

In response to determining to report the CSI to the network node, the terminal device may report the CSI to the network node in the RA procedure, for example, by a RRC message in an UL-SCH and/or a MAC PDU in an UL-SCH.

In accordance with an exemplary embodiment, the terminal device may transmit an UL-SCH without the CSI to the network node in the RA procedure, in response to determining not to report the CSI to the network node.

Figure 4B:
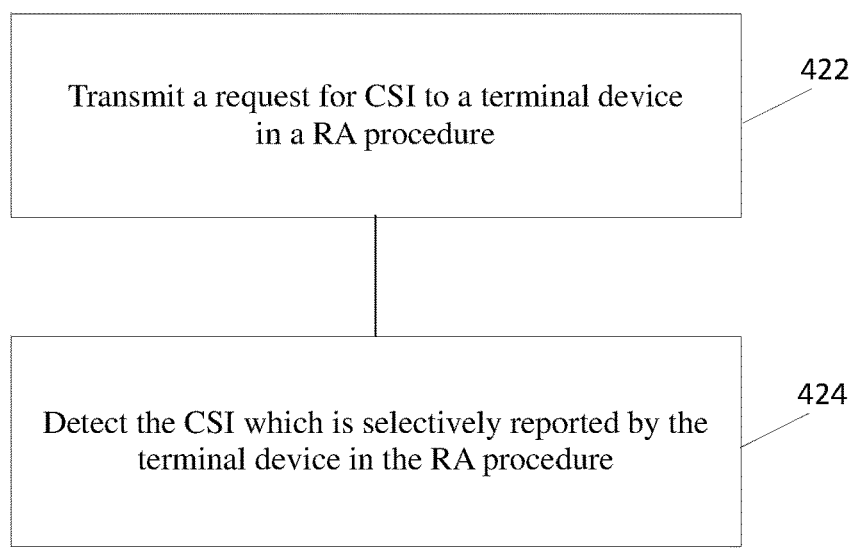
FIG. 4B is a flowchart illustrating a further method according to some embodiments of the present disclosure.

FIG. 4B is a flowchart illustrating a method 420 according to some embodiments of the present disclosure. The method 420 illustrated in FIG. 4B may be performed by a network node or an apparatus communicatively coupled to the network node. In accordance with an exemplary embodiment, the network node may comprise a base station such as a gNB. The network node may be configured to communicate with one or more terminal devices such as UEs which can connect to the network node by performing a RA procedure (e.g., a two-step or four-step RA procedure).

According to the exemplary method 420 illustrated in FIG. 4B, the network node may transmit a request for CSI to a terminal device (e.g. the terminal device as described with respect to FIG. 4A) in a RA procedure, as shown in block 422. In accordance with an exemplary embodiment, the network node may detect the CSI which is selectively reported by the terminal device in the RA procedure, as shown in block 424.

It can be appreciated that the steps, operations and related configurations of the method 420 illustrated in FIG. 4B may correspond to the steps, operations and related configurations of the method 410 illustrated in FIG. 4A. It also can be appreciated that the determination of whether to report the CSI according to the method 410 and the selective reporting of the CSI according to the method 420 may be based on the same or similar parameter(s) and/or rule(s).

Various exemplary embodiments according to the present disclosure may enable a UE to indicate the support and/or presence of an early CSI report to a gNB, for example, by a RA preamble, a RO, a RA type, an identifier in a protocol header, etc. In an exemplary embodiment, specific preambles may be reserved in SIB1 for the UE capable of reporting early CSI. In four-step RACH, a new IE in numberOfRA-PreamblesGroupC may be used for a group of preambles and configured in SIB1 for the UE to trigger an early CSI report. Similar schemes may be applicable to both two-step RACH and four-step RACH, where the two-step RACH may need an extra mapping between the reserved preamble to MsgA PUSCH resource. In an exemplary embodiment, a specific RO may be reserved for the UE enabled with early CSI reporting. Similar schemes may be applicable to both two-step RACH and four-step RACH, where the two-step RACH may need a mapping from the specific RO to MsgA PUSCH resource. In an exemplary embodiment, the chosen RA type (e.g. two-step RACH or four-step RACH, etc.) may be used to implicitly indicate the UE's support of an early CSI report. For example, the UE capable of early CSI may use two-step RACH while the UE not supporting early CSI may use four-step RACH, or vice versa. In another exemplary embodiment, the UE's support of an early CSI report may be indicated by the presence of an LCID in a MAC header, where the LCID may indicate whether the early CSI report is carried in an UL-SCH.

In accordance with some exemplary embodiments, the early CSI (e.g. RSRP, coverage, the camped SSB index, etc.) may be implicitly indicated by a RA preamble, a RO, a RA type, an identifier in a protocol header, etc. According to an exemplary embodiment, an early CSI report may be transmitted to a gNB by a UE in a RRC message in Msg3 or MsgA PUSCH. In some exemplary embodiments, the UE may further determine whether and/or when to transmit the early CSI report, e.g. according to control signaling identifying a predetermined set of preambles or ROs to be used with early CSI transmission, a signal quality measurement for early CSI transmission, resource allocation for early CSI transmission, etc.

Application of various exemplary embodiments can enhance network performance with effective link adaptation and improved resource utilization, while keeping the flexibility for reporting CSI in a RA procedure without significantly increase system overhead and implementation complexity.

The various blocks shown in FIGS. 3A-3B and FIGS. 4A-4B may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
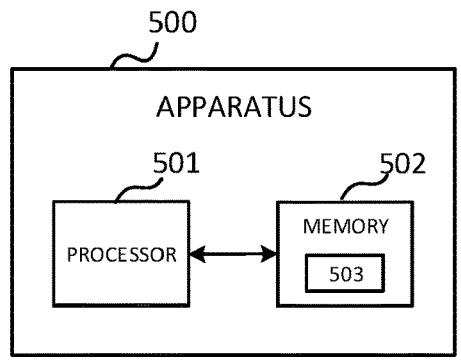
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a terminal device as described with respect to FIG. 3A or FIG. 4A, or a network node as described with respect to FIG. 3B or FIG. 4B. In such case, the apparatus 500 may be implemented as a terminal device as described with respect to FIG. 3A or FIG. 4A, or a network node as described with respect to FIG. 3B or FIG. 4B.

In some implementations, the one or more memories 502 and the computer program codes 503 may be configured to, with the one or more processors 501, cause the apparatus 500 at least to perform any operation of the method as described in connection with FIG. 3A. In some implementations, the one or more memories 502 and the computer program codes 503 may be configured to, with the one or more processors 501, cause the apparatus 500 at least to perform any operation of the method as described in connection with FIG. 3B. In some implementations, the one or more memories 502 and the computer program codes 503 may be configured to, with the one or more processors 501, cause the apparatus 500 at least to perform any operation of the method as described in connection with FIG. 4A. In other implementations, the one or more memories 502 and the computer program codes 503 may be configured to, with the one or more processors 501, cause the apparatus 500 at least to perform any operation of the method as described in connection with FIG. 4B. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6A:
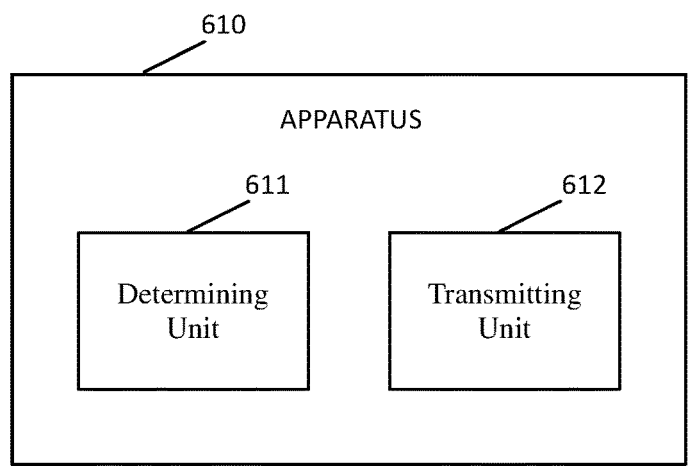
FIG. 6A is a block diagram illustrating another apparatus according to some embodiments of the present disclosure.

FIG. 6A is a block diagram illustrating an apparatus 610 according to some embodiments of the present disclosure. As shown in FIG. 6A, the apparatus 610 may comprise a determining unit 611 and a transmitting unit 612. In an exemplary embodiment, the apparatus 610 may be implemented in a terminal device such as a UE. The determining unit 611 may be operable to carry out the operation in block 312, and the transmitting unit 612 may be operable to carry out the operation in block 314. Optionally, the determining unit 611 and/or the transmitting unit 612 may be operable to carry out more or less operations to implement the proposed methods according to the exemplary embodiments of the present disclosure.

Figure 6B:
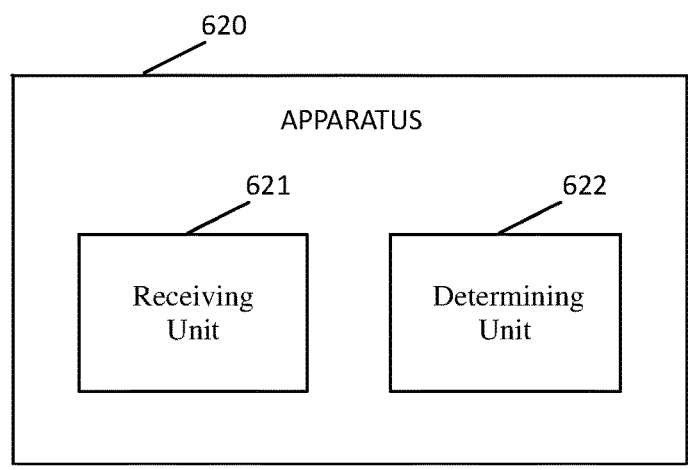
FIG. 6B is a block diagram illustrating another apparatus according to some embodiments of the present disclosure.

FIG. 6B is a block diagram illustrating an apparatus 620 according to some embodiments of the present disclosure. As shown in FIG. 6B, the apparatus 620 may comprise a receiving unit 621 and a determining unit 622. In an exemplary embodiment, the apparatus 620 may be implemented in a network node such as a base station. The receiving unit 621 may be operable to carry out the operation in block 322, and the determining unit 622 may be operable to carry out the operation in block 324. Optionally, the receiving unit 621 and/or the determining unit 622 may be operable to carry out more or less operations to implement the proposed methods according to the exemplary embodiments of the present disclosure.

Figure 6C:
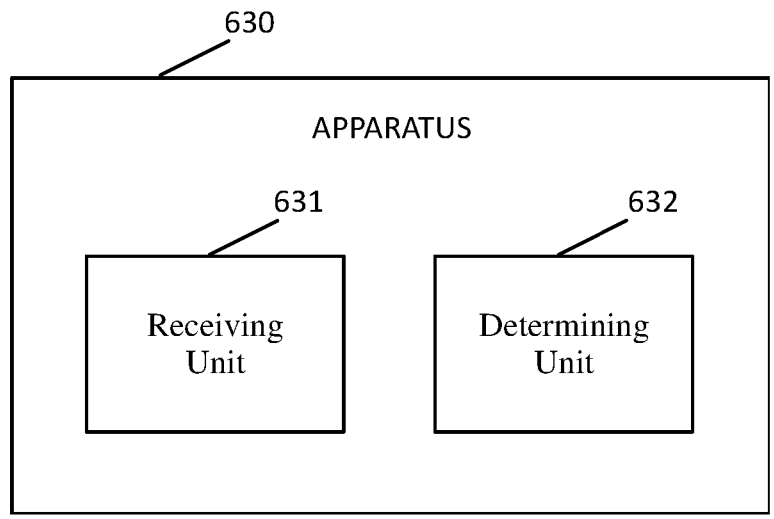
FIG. 6C is a block diagram illustrating yet another apparatus according to some embodiments of the present disclosure.

FIG. 6C is a block diagram illustrating an apparatus 630 according to some embodiments of the present disclosure. As shown in FIG. 6C, the apparatus 630 may comprise a receiving unit 631 and a determining unit 632. In an exemplary embodiment, the apparatus 630 may be implemented in a terminal device such as a UE. The receiving unit 631 may be operable to carry out the operation in block 412, and the determining unit 632 may be operable to carry out the operation in block 414. Optionally, the receiving unit 631 and/or the determining unit 632 may be operable to carry out more or less operations to implement the proposed methods according to the exemplary embodiments of the present disclosure.

Figure 6D:
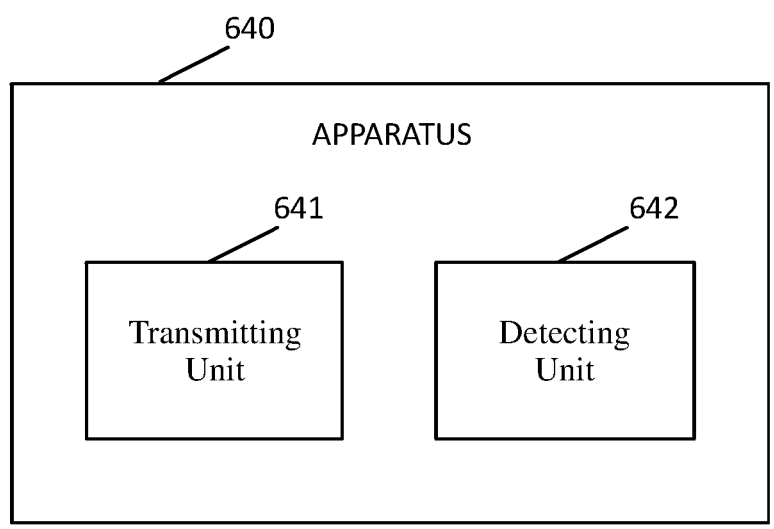
FIG. 6D is a block diagram illustrating a further apparatus according to some embodiments of the present disclosure.

FIG. 6D is a block diagram illustrating an apparatus 640 according to some embodiments of the present disclosure. As shown in FIG. 6D, the apparatus 640 may comprise a transmitting unit 641 and a detecting unit 642. In an exemplary embodiment, the apparatus 640 may be implemented in a network node such as a base station. The transmitting unit 641 may be operable to carry out the operation in block 422, and the detecting unit 642 may be operable to carry out the operation in block 424. Optionally, the transmitting unit 641 and/or the detecting unit 642 may be operable to carry out more or less operations to implement the proposed methods according to the exemplary embodiments of the present disclosure.

Figure 7:
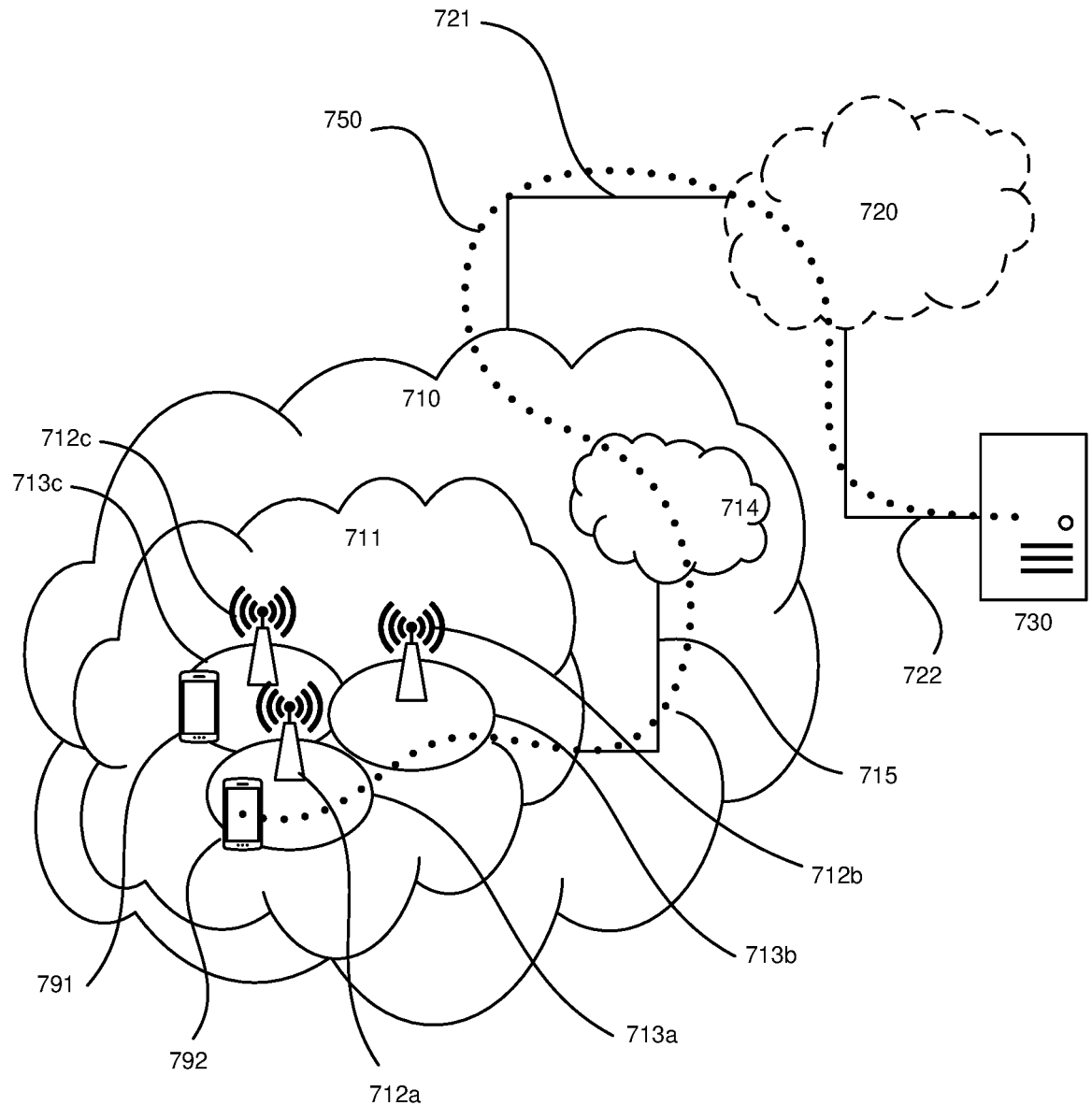
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more subnetworks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
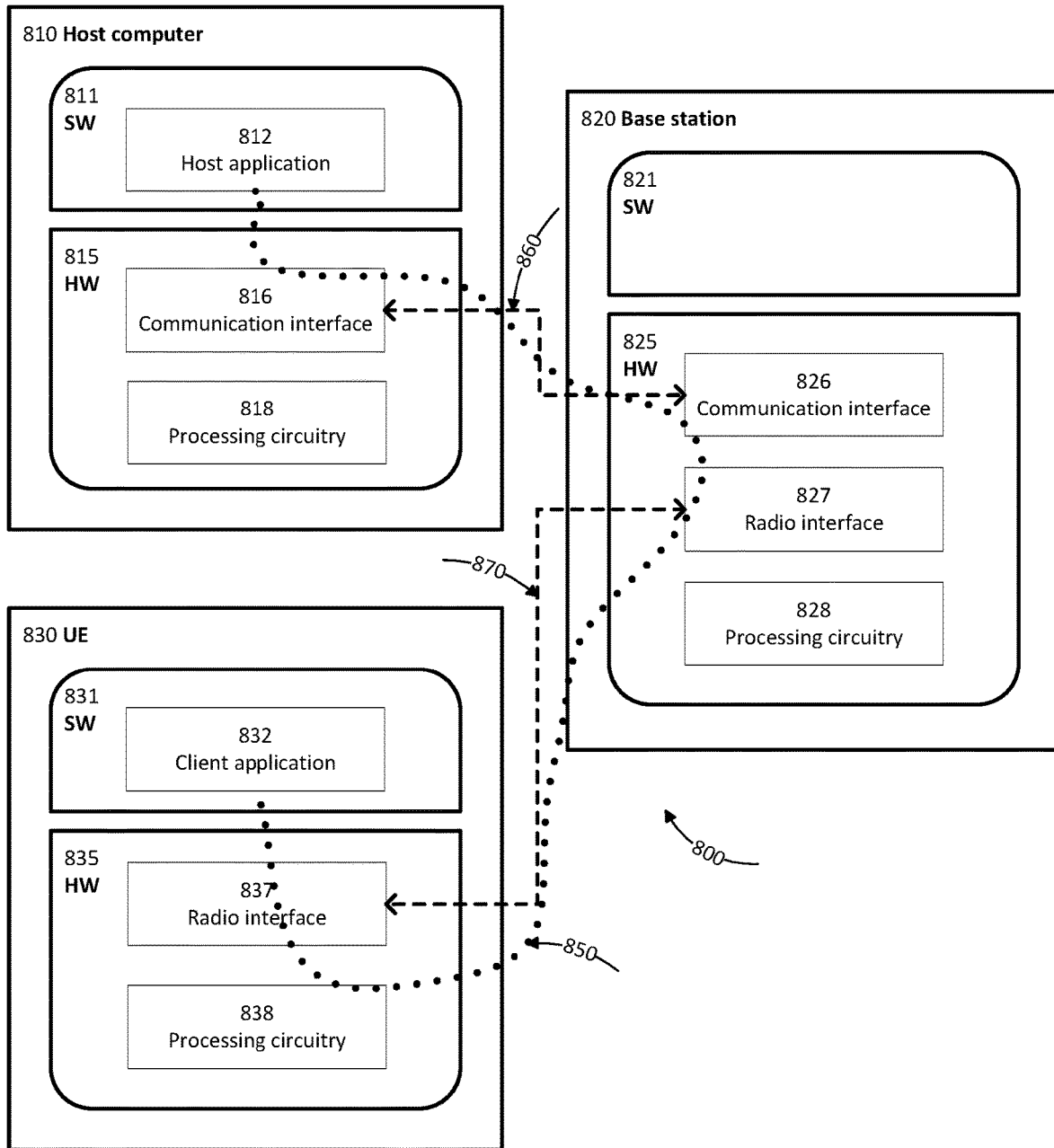
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
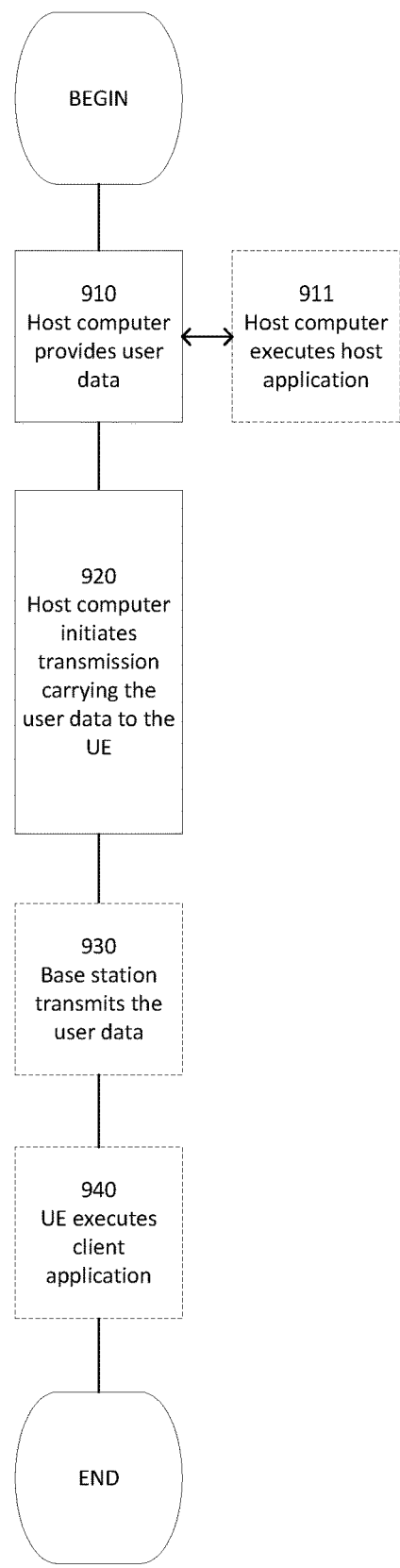
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
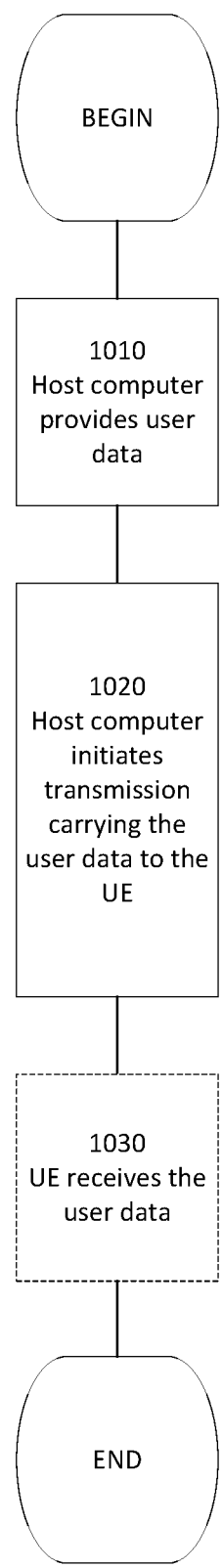
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
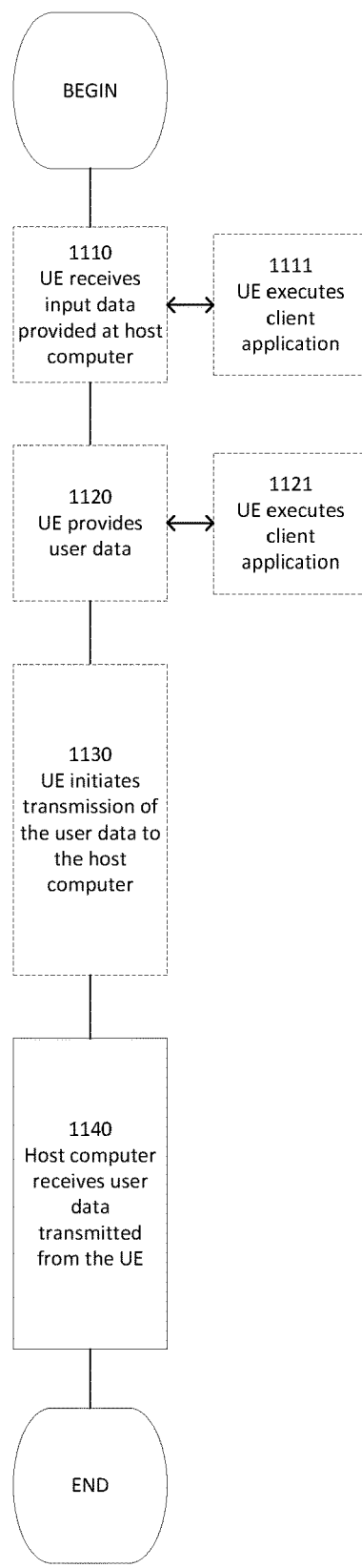
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
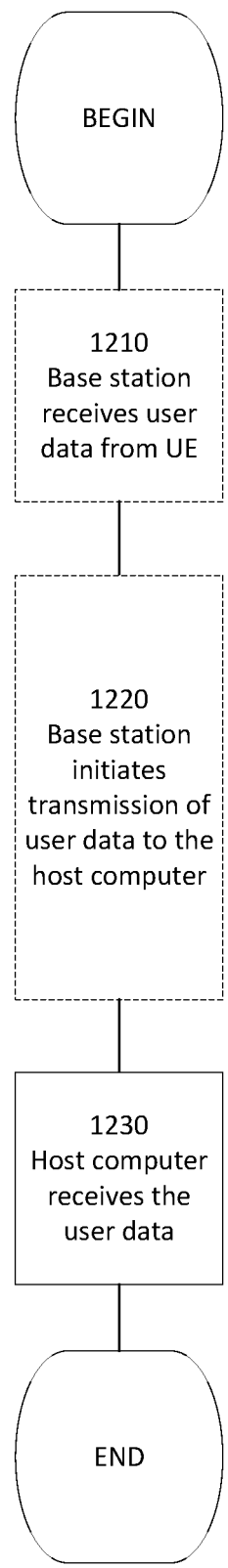
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 320 as describe with respect to FIG. 3B or the exemplary method 420 as describe with respect to FIG. 4B.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 320 as describe with respect to FIG. 3B or the exemplary method 420 as describe with respect to FIG. 4B.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 310 as describe with respect to FIG. 3A or the exemplary method 410 as describe with respect to FIG. 4A.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 310 as describe with respect to FIG. 3A or the exemplary method 410 as describe with respect to FIG. 4A.

According to some exemplary embodiments, there is provided a method implemented in a communication system which may include a host computer, a base station and a UE. The method may comprise, at the host computer, receiving user data transmitted to the base station from the UE which may perform any step of the exemplary method 310 as describe with respect to FIG. 3A or the exemplary method 410 as describe with respect to FIG. 4A.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 310 as describe with respect to FIG. 3A or the exemplary method 410 as describe with respect to FIG. 4A.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 320 as describe with respect to FIG. 3B or the exemplary method 420 as describe with respect to FIG. 4B.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 320 as describe with respect to FIG. 3B or the exemplary method 420 as describe with respect to FIG. 4B.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:
   determining whether the terminal device is capable of reporting channel state information to a network node in a random access procedure; and
   transmitting an uplink message to the network node in the random access procedure to indicate a result of the determination;
   wherein the uplink message includes a preamble in a random access occasion selected from a predetermined set of random access occasions, and the random access occasion is used to indicate that the terminal device is capable of reporting the channel state information to the network node in the random access procedure;
   wherein the uplink message indicates whether the terminal device is capable of reporting the channel state information to the network node in the random access procedure, by using one or more of: the random access occasion; and an identifier in a protocol header.

2. The method according to claim 1, wherein the preamble is further used to indicate at least part of the channel state information to the network node.

3. The method according to claim 1, wherein the predetermined set of random access occasions are reserved or configured for terminal devices capable of reporting channel state information during random access; and/or
   wherein the predetermined set of random access occasions are informed to the terminal device by a second signaling from the network node, and the second signaling includes one or more of:
   frequency information of the predetermined set of random access occasions; and
   time information of the predetermined set of random access occasions; and/or
   wherein the random access occasion is further used to indicate at least part of the channel state information to the network node.

4. The method according to claim 1, wherein the identifier is a logical channel identifier, and the protocol header is a header of a medium access control protocol data unit included in the uplink message; and/or
   wherein the identifier is further used to indicate at least part of the channel state information to the network node.

5. The method according to claim 1, wherein the uplink message is associated with a random access type, and the random access type is used to indicate that the terminal device is capable of reporting the channel state information to the network node in the random access procedure.

6. The method according to claim 5, wherein the random access type comprises at least one of: two-step random access, four-step random access, contention-based random access and contention-free random access.

7. The method according to claim 5, wherein the random access type is further used to indicate at least part of the channel state information to the network node.

8. The method according to claim 1, wherein the terminal device is determined to be capable of reporting the channel state information, and the method further comprises:
receiving a request for the channel state information from the network node in the random access procedure; and
determining whether to report the channel state information to the network node in the random access procedure.

9. The method according to claim 8, wherein the determination of whether to report the channel state information to the network node in the random access procedure is according to one or more of:
whether downlink signaling is received by the terminal device from the network node to activate the reporting of the channel state information;
whether a measurement on signal quality of the terminal device meets a first requirement; and
whether resource allocation for reporting the channel state information meets a second requirement.

10. The method according to claim 9, wherein the downlink signaling indicates one or more of:
a predetermined group of preambles which are configured for terminal devices capable of reporting channel state information during random access; and
a predetermined set of random access occasions which are reserved or configured for terminal devices capable of reporting channel state information during random access.

11. The method according to claim 8, further comprising:
reporting the channel state information to the network node in the random access procedure, in response to determining to report the channel state information to the network node.

12. The method according to claim 11, wherein the channel state information is reported at least partly to the network node by a radio resource control message in an uplink shared channel.

13. The method according to claim 11, wherein the channel state information is reported at least partly to the network node by a medium access control protocol data unit in an uplink shared channel.

14. The method according to claim 8, further comprising:
transmitting an uplink shared channel without the channel state information to the network node in the random access procedure, in response to determining not to report the channel state information to the network node.

15. A terminal device, comprising:
one or more processors; and
one or more memories comprising computer program codes,
the one or more memories and the computer program codes configured to, with the one or more processors, cause the terminal device at least to:
determine whether the terminal device is capable of reporting channel state information to a network node in a random access procedure; and
transmit an uplink message to the network node in the random access procedure to indicate a result of the determination;
wherein the uplink message includes a preamble in a random access occasion selected from a predetermined set of random access occasions, and the random access occasion is used to indicate that the terminal device is capable of reporting the channel state information to the network node in the random access procedure;
wherein the uplink message indicates whether the terminal device is capable of reporting the channel state information to the network node in the random access procedure, by using one or more of: the random access occasion; and an identifier in a protocol header.

16. A method performed by a network node, comprising:
receiving an uplink message from a terminal device in a random access procedure; and
determining whether the terminal device is capable of reporting channel state information to the network node in the random access procedure, according to the uplink message;
wherein the uplink message includes a preamble in a random access occasion selected from a predetermined set of random access occasions, and the random access occasion is used to indicate that the terminal device is capable of reporting the channel state information to the network node in the random access procedure;
wherein the uplink message indicates whether the terminal device is capable of reporting the channel state information to the network node in the random access procedure, by using one or more of: the random access occasion; and an identifier in a protocol header.

17. The method according to claim 16, further comprising:
transmitting a request for the channel state information to the terminal device in the random access procedure, in response to determining that the terminal device is capable of reporting the channel state information.

* * * * *